(12) United States Patent
Kihara et al.

(10) Patent No.: US 7,960,012 B2
(45) Date of Patent: *Jun. 14, 2011

(54) LASER-WELDED ARTICLE

(75) Inventors: Tetsuji Kihara, Neyagawa (JP); Satoshi Yamamoto, Neyagawa (JP)

(73) Assignee: Orient Chemical Industries, Ltd., Osaka-shi (JP)

(*) Notice: Subject to any disclaimer, the term of this patent is extended or adjusted under 35 U.S.C. 154(b) by 163 days.

This patent is subject to a terminal disclaimer.

(21) Appl. No.: 11/989,230

(22) PCT Filed: Sep. 20, 2006

(86) PCT No.: PCT/JP2006/319088
§ 371 (c)(1),
(2), (4) Date: Jan. 23, 2008

(87) PCT Pub. No.: WO2007/034970
PCT Pub. Date: Mar. 29, 2007

(65) Prior Publication Data
US 2009/0136717 A1    May 28, 2009

(30) Foreign Application Priority Data

Sep. 21, 2005 (JP) .................................. 2005-273999

(51) Int. Cl.
*B32B 3/00* (2006.01)
*B32B 1/00* (2006.01)
(52) U.S. Cl. .......... 428/174; 428/172; 428/220; 428/57; 156/272.8
(58) Field of Classification Search .................. 428/174, 428/189, 57, 220; 156/272.8
See application file for complete search history.

(56) References Cited

U.S. PATENT DOCUMENTS

| 5,893,959 | A | 4/1999 | Muellich |
| 6,265,081 | B1 | 7/2001 | Urabe et al. |
| 7,713,607 | B2 * | 5/2010 | Sugawara et al. ............... 428/57 |

(Continued)

FOREIGN PATENT DOCUMENTS

DE    38 13 570 A1    11/1989
(Continued)

OTHER PUBLICATIONS

Office Action from U.S. Appl. No. 11/990,692, mailed Nov. 30, 2009.
(Continued)

*Primary Examiner* — Sophie Hon
*Assistant Examiner* — Tahseen Khan
(74) *Attorney, Agent, or Firm* — Oliff & Berridge, PLC

(57) ABSTRACT

It is an object of the present invention to provide a laser-welded article that workpieces prepared simply can be easily unified by laser in one laser welding process without using complicated processes. Moreover, the laser-welded article has an excellent appearance and sufficient welding strength of the molded workpieces, and does not damage the resin property.

The laser-welded article comprises:
an integral construction of a single workpiece that at least a part of curled workpiece is overlapped or plural workpieces that at least a part of each workpiece is piled, which is welded by exothermic through irradiating laser, wherein the single laser-transmissible-absorptive molded workpiece or the plural laser-transmissible-absorptive molded workpieces include a thermoplastic resin and a laser-transmissible absorbent to have an absorbance: a ranging from 0.07 to 2.0, and have abilities of absorbing at least partial beam of the laser and transmitting another partial beam of the laser.

13 Claims, 4 Drawing Sheets

U.S. PATENT DOCUMENTS

| | | |
|---|---|---|
| 2003/0039837 A1* | 2/2003 | Koshida et al. ............ 428/411.1 |
| 2003/0125429 A1 | 7/2003 | Joachimi et al. |
| 2003/0130381 A1 | 7/2003 | Joachimi et al. |
| 2004/0102559 A1 | 5/2004 | Oyamada et al. |
| 2005/0203225 A1* | 9/2005 | Nakagawa et al. ........... 524/190 |
| 2005/0208361 A1 | 9/2005 | Enjoji et al. |
| 2007/0065659 A1 | 3/2007 | Kihara et al. |

FOREIGN PATENT DOCUMENTS

| | | |
|---|---|---|
| DE | 43 03 061 A1 | 8/1993 |
| EP | 1 418 202 A2 | 5/2004 |
| JP | B-07-014412 | 3/1987 |
| JP | A-2003-514684 | 4/2003 |
| JP | A-2004-148800 | 5/2004 |
| JP | A-2004-195829 | 7/2004 |
| JP | A-2004-351730 | 12/2004 |
| JP | A-2005-001172 | 1/2005 |
| JP | A-2005-161620 | 6/2005 |
| JP | A-2005-246692 | 9/2005 |
| JP | A-2005-262531 | 9/2005 |
| JP | A-2005-288947 | 10/2005 |
| WO | WO 00/03865 | 1/2000 |
| WO | WO 03/039843 A1 | 5/2003 |
| WO | WO 2007/034978 A1 | 3/2007 |

OTHER PUBLICATIONS

Office Action for U.S. Appl. No. 11/522,321; mailed Nov. 25, 2009.
Klimpel, A., et al., "Diode-laser butt welding of thermoplastic sheet," Welding International, 2002, 16, (11), pp. 845-850, XP-001132986.
Apr. 22, 2010 Office Action issued in European Application No. 06 798 356.9.
Jun. 24, 2010 Office Action issued in U.S. Appl. No. 11/990,692.

* cited by examiner

LASER-WELDED ARTICLE

TECHNICAL FIELD

The present invention relates to a laser-welded article that a single or plural laser-transmissible-absorptive molded workpiece(s) are welded by laser at a time and unified.

BACKGROUND OF THE INVENTION

For mutually joining workpieces made from a synthetic thermoplastic resin, a method for laser welding is known.

Such a conventional laser welding is executed for example as follows. As shown in FIG. 5, a laser-transmissible workpiece 11 is used for one workpiece and for the other workpiece, a laser-absorptive workpiece 13 is used. These workpieces are then put together. A laser 14 is irradiated from the side of the laser-transmissible workpiece 11 towards the laser-absorptive workpiece 13. And the laser 14 transmitted through the laser-transmissible workpiece 11 is absorbed into the laser-absorptive workpiece 13, and then exothermic is caused thereat. The exothermic melts the laser-absorptive workpiece 13 mainly at a laser-absorbing part, and then it melts the laser-transmissible workpiece 11 to weld both workpieces. After cooling, the laser-transmissible workpiece 11 and the laser-absorptive workpiece 13 are joined at a welding position 15.

Merits of the laser welding are feasibility of welding workpieces without any contacts of a laser beam source to workpieces being due to weld; little thermal influence on laser-absorbing neighborhood by local exothermic; no threat of mechanical vibration; feasibility of mutually welding fine parts or workpieces having three-dimensionally complicated structures; excellent reproducibility; feasibility of maintaining sufficient airtightness; excellent welding strength; difficulty of recognizing a boundary line of a welding position by visual observation; no generation of dust and so on.

According to the laser welding, it is not only capable of welding certainly by simple operation but also achieving equal or more welding strength compared with prior methods for joining resin parts. Examples of the prior methods for joining resin parts are clamping by a clamp such as a bolt, a screw, a clip and so on, adhering by an adhesive material, vibration welding, ultrasonic welding and so on. Because of its little vibratory or thermal influence on the laser-welded article, the laser welding also achieves labor saving, improvement of productivity, lowering of production costs and so on. Accordingly, in the automobile industry, the electric industry or the electronic industry for example, the laser welding is practical for joining functional parts or electronic parts that are due to avoid the vibratory or thermal influence thereon. Also the laser welding can be adapted for joining resin parts having a complicated shape.

As a technique of the laser welding, a method for the laser welding is mentioned in Japanese Patent Provisional Publication No. 62-49850. In the method, a laser-absorptive synthetic thermoplastic resin workpiece to which a carbon black that absorbs a laser is added and a laser-transmissible synthetic thermoplastic resin workpiece are piled, and then a laser is irradiated from the side of the laser-transmissible synthetic thermoplastic resin workpiece to weld both workpieces. In this case, the laser-transmissible molded workpiece and the laser-absorptive molded workpiece need to be prepared separately.

In International Publication No. WO2003/039843, another method for the laser welding is mentioned. In the method, a thermoplastic resin molded workpiece A, a thermoplastic resin molded workpiece B and a heat-releasing material C having an infrared transmitting part are in contact in order of C/A/B, and then an infrared ray is irradiated from the side of the heat-releasing material C to weld these workpieces. In this case, it is not necessary to prepare the thermoplastic resin molded workpieces A and B separately, and the workpieces may be formed using similar thermoplastic resin. However, the specific heat-releasing material C must be used in order to adjust the exothermic at the time of laser welding. Therefore, the working process is complicated.

In Japanese Patent Provisional Publication No. 2004-351730, another method for the laser welding is also mentioned. In the method, a joining flange part is respectively preformed as a joint flap for welding on a laser-transmissible resin workpiece and on the laser-absorptive resin workpiece, and the flange parts of each workpiece are butted. Then, a laser is irradiated from the side of the flange part of the laser-transmissible resin workpiece to weld and unify both resin workpieces. In this case, the laser-transmissible resin workpiece and the laser-absorptive resin workpiece need to be prepared separately.

SUMMARY OF THE INVENTION

The present invention has been developed to solve the foregoing problems. It is an object of the present invention to provide a laser-welded article that is prepared by unifying workpieces simply prepared by a single laser welding process without any complicated processes. Moreover, the laser-welded article has sufficient welding strength of the molded workpieces and does not damage the resin property.

The inventors of the present invention found out that a laser-welded article joined still more firmly compared with a laser-welded article obtained by a conventional laser-welding method in which a laser-transmissible molded workpiece and a laser-absorptive molded workpiece are welded, can be obtained as follows. A laser is irradiated to a single or plural laser-transmissible-absorptive molded workpiece(s), whose absorbance is adjusted to a specific absorbance so that the workpiece absorbs a partial laser and transmits another partial laser. Then, the workpieces are welded using exothermic and heat conduction from the molded workpiece. Due to a large and deep melting phenomenon occurred at the welding part, a laser-welded article joined still more firmly is obtained.

A laser-welded article of the present invention developed for accomplishing the foregoing objects comprises:

an integral construction of a single workpiece that is bent into a roll-shape and at least overlapped in part or plural workpieces that at least a part of each workpiece is piled, which is welded by exothermic through irradiating laser, wherein the single laser-transmissible-absorptive molded workpiece or the plural laser-transmissible-absorptive molded workpieces include a thermoplastic resin and a laser-transmissible absorbent to have absorbance: a ranging from 0.07 to 2.0, and have abilities of absorbing at least partial beam of the laser and transmitting another partial beam of the laser.

A preferable example of preparing the laser-welded article is as follows. Firstly, exothermic is occurred at the molded workpiece of the laser-irradiated side, and the exothermic melts the resin. Then, the melting of the resin is spread toward an interface of piled workpieces. Finally, a widespread melting is occurred, and the laser-welded article having sufficient strength is obtained.

The laser-transmissible absorbent has weak absorptiveness to a wavelength of used laser. An absorption coefficient $\epsilon_d$ of the laser-transmissible absorbent is for example ranging from 1000 to 8000 (ml/g·cm), preferably ranging from 1000 to 6000, further preferably ranging from 3000 to 6000. The laser-transmissible-absorptive molded workpiece comprising the laser-transmissible absorbent has not only a characteristic of laser-transmissible property but also a characteristic of weak laser-absorptive property.

A single or plural (two or more than three) laser-transmissible-absorptive molded workpiece(s) may be laser-welded as a laser-welded article. When a single laser-transmissible-absorptive molded workpiece is used, a part of the workpiece and the other part thereof, for example both edges of the workpiece, or the edge of the workpiece and the central part thereof, are overlapped by folding down or bending the workpiece into a roll-shape, and then the laser welding is performed at the overlapped portion. As a result, the laser-welded article is achieved. When plural laser-transmissible-absorptive molded workpieces are used, a part of the workpiece and a part of another workpiece, for example an edge of the workpiece and an edge of another workpiece, or an edge of the workpiece and a central part of another workpiece, are piled, and then the laser welding is performed at the piled portion. As a result, the laser-welded article is achieved. The laser-welding may be performed at a part of the laser-transmissible-absorptive molded workpiece or at plural parts thereof.

The single or plural laser-transmissible-absorptive molded workpiece(s) may have thickness ranging from 200 to 5000 microns.

The laser-transmissible-absorptive molded workpiece is obtained by molding a resin composition comprising at least the laser-transmissible absorbent and the thermoplastic resin. It is preferable that the thermoplastic resin is polyamide resin, polycarbonate resin, polyphenylene sulfide resin, polybutylene terephthalate resin or polyolefin-type resin. The laser-transmissible-absorptive molded workpiece preferably comprises at least one resin selected from the above-mentioned thermoplastic resin.

The laser-transmissible-absorptive molded workpieces having the absorbance: a ranging from 0.07 to 2.0 are used for the laser-welded article. The workpieces are piled, and then the laser welding is performed. It is preferable that the absorbance: a is ranging from 0.07 to 0.8. If the absorbance is within this range, an effective range of the transmissivity to perform laser-welding with sufficient strength at the molded workpiece of the laser-irradiated side is maintained. As a result, it is presumed that sufficient exothermic of the molded workpiece occurs at the opposite side to the laser-irradiated side, and then melting phenomenon is easily occurred and the welding phenomenon occurs with a little difference of temperature. Consequently, the laser-welded article joined firmly can be obtained.

The range of the practical absorbance: a regarding the preferable resins is shown concretely. If the resin is polyamide resin, the absorbance: a is ranging from 0.1 to 2.0, preferably ranging from 0.1 to 0.8. If the resin is polycarbonate resin, the absorbance: a is ranging from 0.1 to 1.8, preferably ranging from 0.1 to 0.8. If the resin is polypropylene resin, the absorbance: a is ranging from 0.1 to 0.9, preferably ranging from 0.1 to 0.8.

If the laser-transmissible-absorptive molded workpiece is formed using polyamide resin, polycarbonate resin or polypropylene resin, an absorption coefficient: $\epsilon_j$ (an absorption coefficient: $\epsilon_{j1}$ and an absorption coefficient: $\epsilon_{j2}$ in case of using two workpieces) to 940 nm of the laser is for example ranging from 200 to 8000 (l/cm), preferably ranging from 1000 to 8000. If the laser-transmissible-absorptive molded workpiece is formed using polybutylene terephthalate resin or polyphenylene sulfide resin, an absorption coefficient: $\epsilon_j$ (an absorption coefficient: $\epsilon_{j1}$ and an absorption coefficient: $\epsilon_{j2}$ in case of using two workpieces) is for example ranging from 3000 to 15000 (l/cm), preferably ranging from 9000 to 14000.

The laser-welded article of the present invention is explained exemplifying a case in which the laser-transmissible-absorptive molded workpiece 1 and the laser-transmissible-absorptive molded workpiece 2 are laser-welded as shown in FIG. 1.

The absorbance of the molded workpiece 1 of the laser-irradiated side is defined as $a_1$, and the absorbance of the molded workpiece 2 is defined as $a_2$. It is preferable that the ratio $a_1/a_2$ of the absorbance $a_1$ and the absorbance $a_2$ is ranging from 0.8 to 1.3. It is much preferable that the absorbance $a_1$ and the absorbance $a_2$ are equal and that the ratio $a_1/a_2$ is 1. If the ratio is closer to 1, the appearance, the hue and the joining portion of the laser-welded article look pretty. Moreover, if the absorbance of the workpieces is equal or nearly equivalent, it is not necessary to distinguish the side of two molded workpieces from which the laser is irradiated. Therefore, the treatment thereof at the time of laser welding is simple.

When the laser-transmissible-absorptive molded workpiece 1 and the laser-transmissible-absorptive molded workpiece 2 are used, a product of a concentration $C_1$ (wt %) of the laser-transmissible absorbent and thickness $L_1$ (cm) of the workpiece 1 is defined as $C_1L_1$, and a product of a concentration $C_2$ (wt %) of the laser-transmissible absorbent and thickness $L_2$ (cm) of the workpiece 2 is defined as $C_2L_2$. It is preferable that at least one of $C_1L_1$ and $C_2L_2$ is ranging from $0.01 \times 10^{-3}$ to $4.0 \times 10^{-3}$.

The laser-welded article of the present invention is obtained by welding a single or plural laser-transmissible-absorptive molded workpiece(s) which has laser-transmissible property and laser-absorptive property, by using laser. Because it is not necessary to distinguish the laser-transmissible-absorptive molded workpieces, it is easy to manage the workpieces. Furthermore, a complicated operation such as an adjustment of the order or the direction of the piled workpieces is not necessary at the time of the laser-welding.

The laser-welded article is simply manufactured without any inconvenient pretreatment to the surface of a workpiece for adhering workpieces made from resin or any complicated processes such as alloying. The laser-welded article can be manufactured even if the laser is irradiated from either side of put laser-transmissible-absorptive molded workpieces. Furthermore, the laser-welded article can be manufactured with adjusting an irradiating angle of the laser freely, so the workpiece having a complicated shape can be joined. This laser-welded article is welded by laser in one laser welding process and therefore has high productive efficiency.

The intrinsic properties of the resin forming the laser-welded article are not influenced, and the laser-welded article has sufficient welding strength. Furthermore, a void by an excess energy at the melting portion, which is generated at the time of conventional laser-welding of a laser-transmissible molded workpiece and a laser-absorptive molded workpiece, is not generated. And adhesive materials or clamps for joining are not used for the laser-welded article. Therefore, the laser-welded article has excellent recycling property.

DETAILED EXPLANATION OF THE INVENTION

Figure 1:
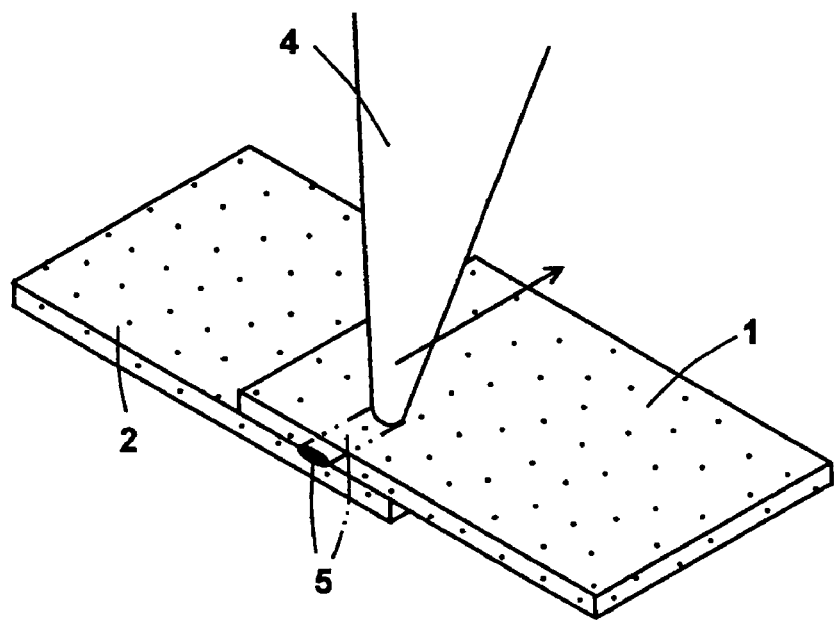
FIG. 1 shows one embodiment of preparing a laser-welded article to which the present invention is applied, by welding the plural piled laser-transmissible-absorptive molded workpieces using the laser.

Hereunder, one embodiment of the laser-welded article of the present invention is explained in detail as referring to FIG. 1 that corresponds to Examples.

Laser-transmissible-absorptive molded plate workpieces 1 and 2 are used for preparing a laser-welded article of the present invention. The workpieces 1 and 2 are prepared by the heat-molding of a laser-transmissible resin of a thermoplastic resin comprising a laser-transmissible absorbent. The laser-transmissible absorbent has properties of absorbing partial of laser 4 having a wavelength used for the laser welding and transmitting the residual laser 4. The edges of each laser-transmissible-absorptive molded workpiece 1 and 2 are put together and piled, and are firmly welded and unified to prepare the laser-welded article.

The laser-welded article is prepared as follows. First, the laser is irradiated to the laser-transmissible-absorptive molded workpiece 1 as shown in FIG. 1. The laser-transmissible-absorptive molded workpiece 1 transmits a partial of the irradiated-laser and absorbs another partial of the irradiated-laser. The exothermic occurs at the neighborhood of laser-irradiated part of the molded workpiece 1, and then the molded workpiece 1 melts gradually. The laser transmitted the laser-transmissible-absorptive molded workpiece 1 reaches the laser-transmissible-absorptive molded workpiece 2 and is absorbed partially to the molded workpiece 2. As a result, the exothermic occurs at the molded workpiece 2. Because the absorbance and the transmissivity of the laser-transmissible-absorptive molded workpieces 1 and 2 are adjusted properly, the quantity of the laser which reaches the molded workpiece 2 changes, and the quantity of the exothermic is adjusted properly. A heat conduction or a heat radiation occurs at an interface of the laser-transmissible-absorptive molded workpieces 1 and 2.

That is to say, the resin of the laser-transmissible-absorptive molded workpiece 1 melts by the exothermic, and then the melting of the resin spreads gradually toward the interface of the laser-transmissible-absorptive molded workpieces 1 and 2. The large and deep melting is generated at both molded workpieces 1 and 2. Consequently, the laser-transmissible-absorptive molded workpieces 1 and 2 are firmly welded by the laser.

One embodiment of the manufacturing process for the laser-welded article is explained in detail. The manufacturing process thereof consists of the following procedures (A) to (D), for example.

(A) A laser-transmissible-absorptive resin composition which comprises at least a thermoplastic resin and a laser-transmissible absorbent, and may comprises an additive if necessary is molded to obtain a laser-transmissible-absorptive molded workpiece 1 that is put to the laser-irradiated side. The molded workpiece 1 has the absorbance: $a_1$ ranging from 0.07 to 2.0 to the laser, for example, to 940 nm of the laser.

(B) A laser-transmissible-absorptive molded workpiece 2 for putting together to the laser-transmissible-absorptive molded workpiece 1 is molded. The molded workpiece 2 may be the composition comprising the same composition as the molded workpiece 1, or it may be the composition comprising a combination of different kinds of the composition. The molded workpiece 2 has an absorbance: $a_2$ ranging from 0.07 to 2.0 to the laser, for example, to 940 nm of the laser.

(C) The laser-transmissible-absorptive molded workpiece 1 and the laser-transmissible-absorptive molded workpiece 2 are piled and put together. If necessary on the occasion of fixing the molded workpieces 1 and 2, they may be put together by being pressed with a holding tool. And a material having antireflection property such as an antireflection film may be placed at the side of the laser-transmissible-absorptive molded workpiece, and another material having cooling effect or a gas treatment equipment may also be placed thereto.

(D) The laser 4 adjusted to the appropriate condition is irradiated from the side of the molded workpiece 1. The molded workpiece 1 transmits a partial of the irradiated laser 4 and absorbs another partial of the irradiated laser 4, and then exothermic occurs thereat. The transmitted laser 4 reaches the molded workpiece 2 and is absorbed thereto, and then exothermic occurs thereat. The molded workpieces 1 and 2 melt at the neighborhood of the exothermic part thereof. When the melting position thereof is cooled down, it hardens, and then the molded workpieces 1 and 2 are welded. Consequently, the molded workpieces 1 and 2 are firmly joined at a welding position 5 and are unified.

Figure 3:
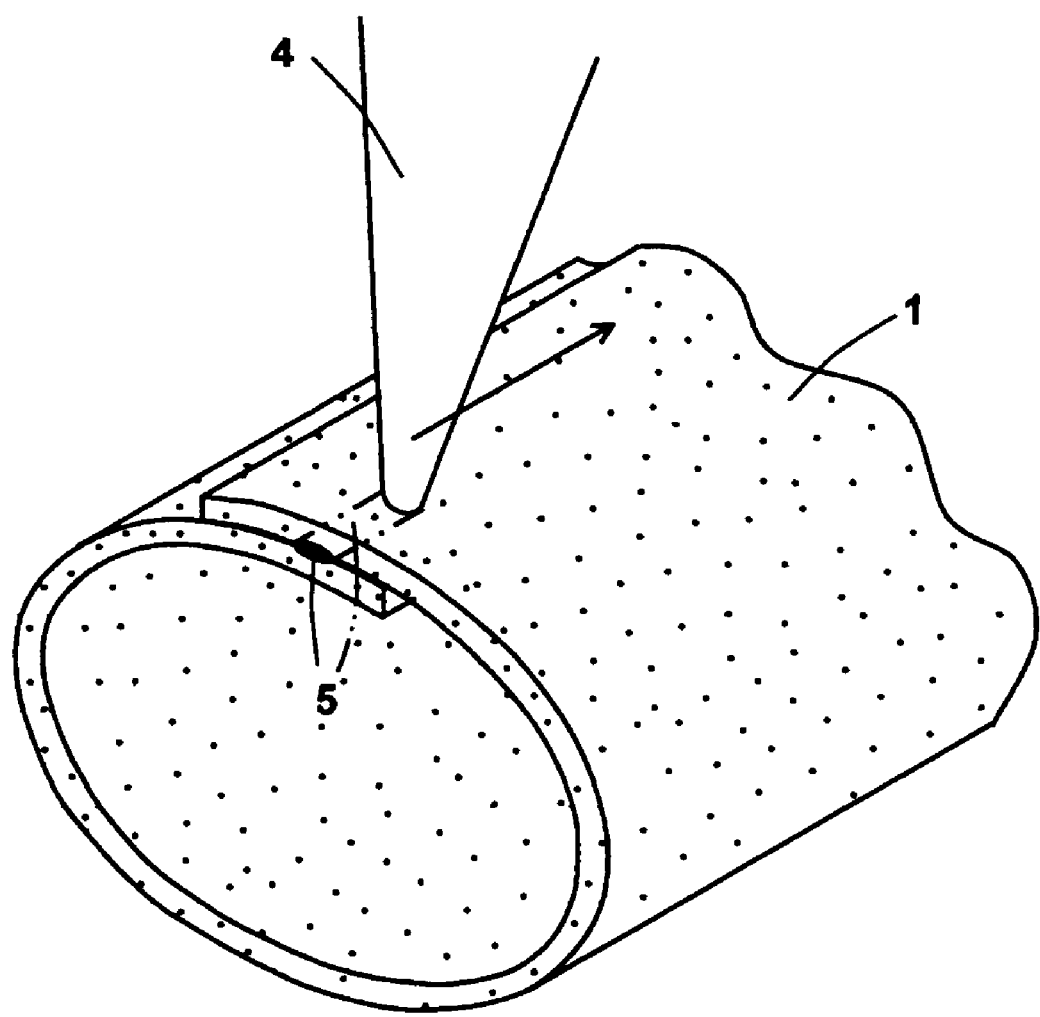
FIG. 3 shows one embodiment of preparing a laser-welded article to which the present invention is applied, by welding the single curled laser-transmissible-absorptive molded workpiece using the laser.

As shown in FIG. 3, a single laser-transmissible-absorptive molded film workpiece 1 may be used for preparing another laser-welded article. The laser-transmissible-absorptive molded workpiece 1 is obtained by heat-molding of the laser-transmissible-absorptive resin composition comprising the thermoplastic resin of the laser-transmissible resin and the laser-transmissible absorbent. The laser-transmissible absorbent has properties of absorbing partial of the laser 4 having a wavelength used for the laser welding and transmitting the residual laser. The laser-welded article joined firmly can be obtained by bending the laser-transmissible-absorptive molded workpiece 1 into a roll-shape, overlapping both edges of the workpiece 1, and then performing the laser-welding at the overlapped part.

One embodiment of the manufacturing process for the laser-welded article is explained in detail. The manufacturing process thereof consists of the following procedures (E) to (G), for example.

(E) A laser-transmissible-absorptive resin composition which comprises at least a thermoplastic resin and a laser-transmissible absorbent, and may comprise an additive if necessary is molded to obtain a laser-transmissible-absorptive molded workpiece 1. The molded workpiece 1 has the absorbance: $a_1$ ranging from 0.07 to 2.0 to the laser, for example, to 940 nm of the laser.

(F) The laser-transmissible-absorptive molded workpiece 1 is bent into a roll-shape, and both edges of the molded workpiece 1 are overlapped and put together. If necessary on the occasion of overlapping the edges of the molded workpiece 1 for fixing, they may be put together by being pressed with a holding tool. And a material having antireflection property such as an antireflection film may be placed at the laser-irradiated side of the workpiece 1, and another material having cooling effect or a gas treatment equipment may also be placed thereto. The molded workpiece 1 that is molded into a roll-shape or pipe-shape by using a metal mold that has roll-shape or pipe-shape may be used.

(G) The laser 4 adjusted to the appropriate condition is irradiated to the overlapped portion of the workpiece. A partial of the irradiated laser 4 transmits the upper side at the overlapped portion of the molded workpiece 1, and another partial of the irradiated laser 4 is absorbed to the lower side at the overlapped portion of the molded workpiece 1. Then exothermic occurs thereat. Consequently, the neighborhood of the exothermic portion at the overlapped portion of the molded workpiece 1 melts. When the melting position thereof is cooled down, it hardens, and then the molded workpiece 1 is welded.

The present invention is not intended to be limited to these manufacturing processes.

Figure 2:
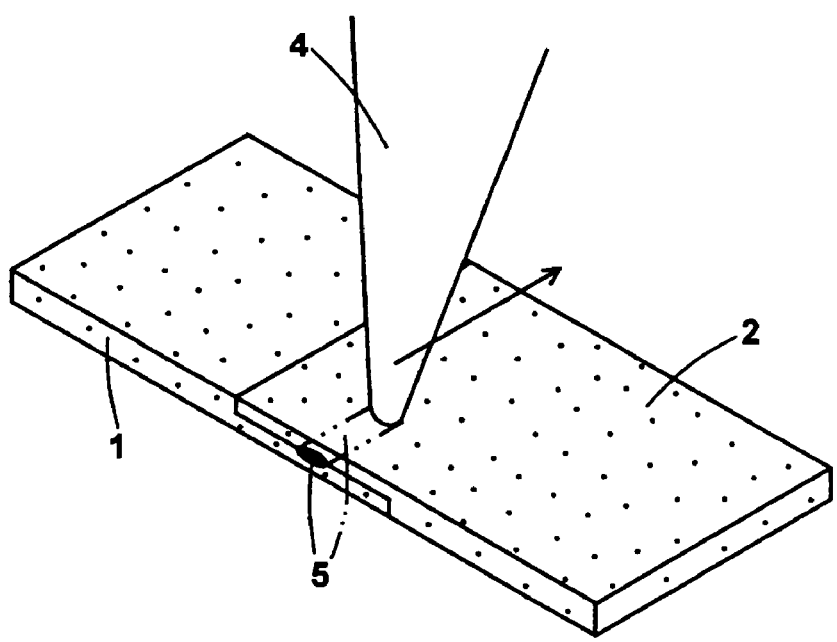
FIG. 2 shows another embodiment of preparing a laser-welded article to which the present invention is applied, by welding the plural piled laser-transmissible-absorptive molded workpieces using the laser.

Incidentally, plural laser-transmissible-absorptive molded flat plate workpieces having even thickness, or a single laser-transmissible-absorptive molded flat film workpiece having even thickness, may be used for the laser-welded article. A single or plural laser-transmissible-absorptive molded workpiece(s) that is formed by using a metal mold or curved or bent into roll-shape, pipe-shape, pole-shape or box-shape may be used for the laser-welded article. The laser-transmissible-absorptive molded workpiece is allowed to take an optional shape. As shown in FIG. 2, the workpieces may respectively have a stair of a joint flap at the piled position.

The heat efficiency of a conventional laser-welding using a laser-transmissible molded workpiece and a laser-absorptive molded workpiece is not so high because exothermic of the laser-absorptive molded workpiece is caused by the irradiated-laser and then the workpiece melts, and the laser-transmissible molded workpiece melts using the caused exothermic. Furthermore, the welding strength of a laser-welded article prepared by the conventional laser-welding is not so firm because the melting of the resin of the laser-transmissible molded workpiece is small and that of the laser-absorptive molded workpiece is large. On the other hand, in the laser-welding of the laser-transmissible-absorptive molded workpieces 1 and 2 of the present invention for example, exothermic is caused at both molded workpieces 1 and 2 at the time of the laser-welding. Therefore, the difference of the temperature between the molded workpieces 1 and 2 is little and the molded workpieces 1 and 2 are welded efficiently with a low energy. Furthermore, the laser-welded article of the present invention has a very firm welding strength because the melting part of the resin of the molded workpieces 1 and 2 spreads widely.

The laser-welded article has practically sufficient welding strength at the welding position 5 where the laser-transmissible-absorptive molded workpieces 1 and 2 are welded. The condition of the laser-welding is selected according to the use or the purpose of the laser-welded article. It is preferable that the tensile stress strength of the prepared laser-welded article is 50N or more in accordance with Japanese Industrial Standard K-7113-1995, further preferably 200N or more.

As the laser used for the laser-welding, it is preferable that the infrared ray ranging from 800 nm to 1600 nm that is a longer wavelength compared with visible radiation, preferably the one ranging from 800 nm to 1100 nm is used. Examples of the laser are solid laser such as Nd: yttrium aluminum garnet (YAG) excitation and semiconductor laser excitation; semiconductor laser, tunable diode laser, titanium-sapphire laser (Nd: YAG excitation) and so on. Other examples are a halogen lamp and a xenon lamp that generate infrared rays having wavelength of 700 nm or more. The laser is allowed to be irradiated vertically or slantingly towards the surface of the laser-transmissible-absorptive molded workpiece and also irradiated from a single or plural direction(s). The output power of the laser is regulated properly according to scanning speed and laser-absorptive property of the laser-transmissible-absorptive molded workpiece.

When the halogen lamp generating infrared rays having wavelength of 700 nm or more is used, many halogen lamps are arranged to a band-shape. Examples of a laser irradiation procedure are a scanning type that the irradiation source of the lamp moves; a masking type that the welding workpieces move; a multi-irradiating type that the welding workpieces are irradiated by the lamp from multi directions at the same time; and so on. An irradiation width, irradiation time and irradiation energy of the infrared rays can be adjusted properly. The halogen lamp has an energy distribution centering on the area near infrared region, so the energy may exist at the shorter wavelength side of the energy distribution, that is to say a visible region. In such a case, the energy of the visible region may be shielded using a cut-off filter because a mark of welding may be generated on the surface of the workpiece.

The laser-transmissible-absorptive molded workpiece is explained more concretely.

In case of a laser-welded article prepared by welding the piled laser-transmissible-absorptive molded workpieces 1 and 2 by the exothermic caused by the irradiated laser to unify, the absorbance: $a_1$ of the molded workpiece 1 and the absorbance: $a_2$ of the molded workpiece 2 are preferably $0.07 \leq (a_1$ and $a_2) \leq 2.0$ to the laser having a wavelength used for the laser-welding. Considering the laser-transmissible property, $a_1$ and $a_2$ are preferably $0.07 \leq (a_1$ and $a_2) \leq 1.0$, further preferably $0.07 \leq (a_1$ and $a_2) \leq 0.8$. In the present invention, it is important to properly adjust the absorbance to all thickness. It is especially important to properly adjust all of the absorbance at the time of piling the workpieces because of the relation of transmissivity of the workpieces.

If the absorbance is within the preferable range, an effective range of the transmissivity for welding the workpieces with sufficient strength is maintained at the laser-irradiated side of the molded workpiece. Therefore, it is presumed that sufficient exothermic occurs at the opposite side of the laser-irradiated side of the molded workpiece, the melting phenomenon tends to occur, and then the welding phenomenon with little difference in temperature occurs. Consequently, the laser-welded article joined firmly can be obtained. Furthermore, it is easy to deal with when changing the thickness of the molded workpiece to obtain the various laser-welded articles.

The range of the practical absorbance: a regarding the preferable resins is shown concretely. If the resin is polyamide resin, the absorbance: a is ranging from 0.1 to 2.0, preferably ranging from 0.1 to 0.8. If the resin is polycarbonate resin, the absorbance: a is ranging from 0.1 to 1.8, preferably ranging from 0.1 to 0.8. If the resin is polypropylene resin, the absorbance: a is ranging from 0.1 to 0.9, preferably ranging from 0.1 to 0.8.

It is preferable that the absorbance: $a_1$ of one molded workpiece and the absorbance: $a_2$ of the other molded workpiece satisfy a condition of $0.5 \leq a_1/a_2 \leq 2.0$, further preferably satisfy a condition of $0.8 \leq a_1/a_2 \leq 1.3$. For example, the absorbance $a_1$ and the absorbance $a_2$ of the laser-transmissible-absorptive molded workpieces 1 and 2 may satisfy numerical equations of $a_1 \geq a_2$, $a_1 \leq a_2$ or $a_1 = a_2$.

It is much preferable that the absorbance $a_1$ and the absorbance $a_2$ is the same value, that is to say $a_1$ and $a_2$ satisfy a numerical equation of $a_1=a_2$, and the appearance, the hue and the joining portion of the laser-welded article is considered. And if the absorbance of the workpieces is equal or nearly equivalent, it is not necessary to distinguish the workpieces, and the treatment thereof at the time of laser welding is simple.

In order to adjust the absorbance of the laser-transmissible-absorptive molded workpiece 1 within the above-mentioned range, it is necessary to select the absorption coefficient $\epsilon_d$ of the laser-transmissible absorbent and adjust the concentration $C_1$ (wt %) of the laser-transmissible absorbent, according to the thickness $L_1$ (cm) of the laser-transmissible-absorptive molded workpiece 1. It is also necessary to similarly adjust the concentration $C_2$ (wt %) of the laser-transmissible absorbent according to the thickness $L_2$ (cm) of the laser-transmissible-absorptive molded workpiece 2.

It is important that the absorption coefficient $\epsilon_{j1}$ and the absorption coefficient $\epsilon_{j2}$ of the laser-transmissible-absorptive molded workpieces 1 and 2 are adjusted to a desired range.

If polyamide resin, polycarbonate resin and polypropylene resin are used, the absorption coefficient $\epsilon_{j1}$ and the absorption coefficient $\epsilon_{j2}$ to 940 nm of the laser are for example $200 \leq \epsilon_{j1}$ (and $\epsilon_{j2}) \leq 8000$ (l/cm), preferably $2000 \leq \epsilon_{j1}$ (and $\epsilon_{j2}) \leq 7500$, further preferably $4000 \leq \epsilon_{j1}$ (and $\epsilon_{j2}) \leq 7000$.

If polybutylene terephthalate resin and polyphenylene sulfide resin are used, the absorption coefficient $\epsilon_{j1}$ and the absorption coefficient $\epsilon_{j2}$ to 940 nm of the laser are for example $3000 \leq \epsilon_{j1}$ (and $\epsilon_{j2}) \leq 15000$ (l/cm), preferably $5000 \leq \epsilon_{j1}$ (and $\epsilon_{j2}) \leq 15000$, further preferably $8000 \leq \epsilon_{j1}$ (and $\epsilon_{j2}) \leq 13000$.

If the absorption coefficient is more than the above-mentioned range, a sudden exothermic of the laser-transmissible-absorptive molded workpieces occurs at the time of laser irradiation with a decrease of the transmissivity, and it is difficult to inhibit the generation of the burn or the void of the molded workpiece. As a result, the laser-welded article cannot achieve sufficient welding strength. If the absorption coefficient is less than the above-mentioned range, insufficient exothermic occurs, and the laser-welded article cannot achieve sufficient welding strength.

If $C_1L_1$ that is a product of a concentration $C_1$ (wt %) of the laser-transmissible absorbent of the molded workpiece 1 and the thickness $L_1$ (cm) of the workpiece 1, and $C_2L_2$ that is a product of a concentration $C_2$ (Wt %) of the laser-transmissible absorbent of the molded workpiece 2 and the thickness $L_2$ (cm) of the workpiece 2, are ranging $0.01 \times 10^{-3} \leq (C_1L_1$ and $C_2L_2) \leq 4.0 \times 10^{-3}$, the laser-welding can be performed excellently.

It is preferable that the laser-transmissible-absorptive molded workpieces 1 and 2 have the thickness ranging from 200 to 5000 microns respectively. If the thickness is less than 200 microns, it is difficult to control the laser energy, and the melting by the exothermic in the laser welding process is insufficient or excess. As a result, the laser-welded article is broken by overheating or cannot achieve sufficient welding strength. On the other hand, if the thickness is more than 5000 microns, the distance between the surface of the laser-transmissible-absorptive molded workpiece and the welded portion 5 is too long, and the transmissivity for the laser decreases. As a result, the laser-welded article cannot achieve sufficient welding strength.

Examples of the laser-transmissible absorbent included in the laser-transmissible-absorptive molded workpieces 1 and 2 are azine-type compound, nigrosine, aniline black, phthalocyanine, naphthalocyanine, porphyrin, cyanin-type compound, perylene, quaterrylene, metal complex, azo dye, anthraquinone, square acid derivative, immonium dye and so on. The absorption coefficient $\epsilon d$ of the laser-transmissible absorbent is ranging from 1000 to 8000 (ml/g·cm), preferably ranging from 1000 to 6000, further preferably ranging from 3000 to 6000.

A measuring procedure of the absorption coefficient Ed is as follows. 0.05 g of the laser-transmissible absorbent is precisely weighed and is dissolved into solvent such as N,N-dimethylformamide (DMF) by using 50 ml type measuring flask. A measuring sample is obtained by diluting 1 ml of the solution by DMF using 50 ml type measuring flask. Then the absorbance of the measuring sample is measured by using a spectrophotometer of catalog No. UV1600PC that is available from Shimazu Corporation.

The coloring of the thermoplastic resin is performed for the purpose of a decorative effect, a color classification effect, improvement of light resistance of the molded product, protection or masking of the contents. A black-coloring is the most essential in the industrial field, and considering the dispersibility or the compatibility of the resin, an oil-soluble dye is suitable for a black-coloring. Therefore, a black oil-soluble dye that can be used for black colorant as well as the laser-transmissible absorbent is most suitable. Among black oil-soluble dye, nigrosine is preferable because more sufficient welding strength can be achieved.

Examples of nigrosine are a black azine-type condensed mixture such as C. I. Solvent Black 5 and C. I. Solvent Black 7 described in Color Index. Among black azine-type condensed mixture, C. I. Solvent Black 7 is preferable. The nigrosine is synthesized by reaction of oxidation and dehydrating condensation of aniline, aniline hydrochloride and nitrobenzene at 160° C. or 180° C. as reaction temperature under the existence of iron chloride. As such nigrosine, NUBIBN BLACK series are commercially available from Orient Chemical Industries, Ltd.

The content of the laser-transmissible absorbent is ranging from 0.001 to 0.5 weight %, preferably ranging from 0.01 to 0.2 weight %, to the laser-transmissible resin. If the content is less than 0.001 weight %, the welding strength of the joining part of the laser-transmissible-absorptive molded workpieces cannot be achieved because even though the workpieces absorb the laser energy, exothermic is weak and thus the temperature does not increase sufficiently. On the other hand, if the content is more than 0.5 weight %, the sufficient welding strength of the laser-transmissible-absorptive molded workpieces cannot be achieved because the transmissivity of the laser is too low. Furthermore, the intrinsic properties of the laser-transmissible resin can be lost easily.

If polyamide resin, polycarbonate resin or polypropylene resin is used as the laser-transmissible resin, the content of the laser-transmissible absorbent is ranging from 0.001 to 0.5 weight %, preferably ranging from 0.002 to 0.2 weight %. If polybutylene terephthalate resin or polyphenylene sulfide resin is used as the laser-transmissible resin, the content of the laser-transmissible absorbent is preferably ranging from 0.001 to 0.2 weight %.

As the laser-transmissible resin that forms the molded workpiece, any kind of the resin that is able to transmit the laser and to contain the laser-transmissible absorbent may be used.

Examples of the laser-transmissible resin are a resin having laser-transmissible property used as a dispersant for the pigment, and known resin used as carrier resin of masterbatch or colored pellets. Concrete typical examples of the resin are thermoplastic resins such as polyphenylene sulfide resin (PPS); polyamide resin (Nylon: a registered trademark, PA); polyolefin resin illustrated with polyethylene resin, polypropylene resin; polystyrene resin; polymethylpentene resin; methacrylate resin; acrylpolyamide resin; ethylenevinylalcohol (EVOH) resin; polycarbonate resin; polyester resin illustrated with polyethylene terephthalate resin (PET), polybutylene terephthalate resin (PBT); polyacetal resin; polyvinyl chloride resin; polyvinylidene chloride resin; polyphenylene oxide resin; polyarylate resin; polyallylsulfone resin; fluorine-contained resin; liquid crystal polymer and so on.

Further, the thermoplastic resin is allowed to be a copolymer resin made from two or more monomers that construct the above-mentioned thermoplastic resins. Concrete examples of the copolymer resin are acrylonitrile-styrene copolymer resin (AS), acrylonitrile-butadiene-styrene copolymer resin (ABS), acrylonitrile-ethylene propylene diene monomer-styrene copolymer resin (AES), polyamide-polybutylene terephthalate copolymer resin (PA-PBT), polyethylene terephthalate-polybutylene terephthalate copolymer resin (PET-PBT), polycarbonate-polybutylene terephthalate copolymer resin (PC-PBT), polycarbonate-polyamide copolymer resin (PC-PA) and so on. And other concrete examples of the resin are a thermoplastic elastomer such as polystyrene-type thermoplastic elastomer, polyolefin-type thermoplastic elastomer, polyurethane-type thermoplastic elastomer, and polyester-type thermoplastic elastomer; synthetic wax or natural wax that contains the above-mentioned resins as the main component. Incidentally, molecular weight of the thermoplastic resins is not intended to be limited. Also, the above-mentioned resins may be used plurally.

It is preferable that the thermoplastic resin is polyamide resin, polycarbonate resin, polypropylene resin, polybutylene terephthalate resin, or polyphenylene sulfide resin. Among these resins, polyamide resin and polycarbonate resin are further preferable, considering the compatibility of the resin to nigrosine.

Examples of the polyamide resin are polyamide 6, polyamide 66, polyamide 46, polyamide 11, polyamide 12, polyamide 69, polyamide 610, polyamide 612, polyamide 96, non-crystal polyamide, polyamide having high melting point, polyamide RIM, polyamide MIX6 and so on; copolymer of two or more kinds thereof such as polyamide 6/66 copolymer, polyamide 6/66/610 copolymer, polyamide 6/66/11/12 copolymer, crystal polyamide/non-crystal polyamide copolymer and so on. The polyamide resin may be mixed polymer of polyamide resin and another synthetic resin. Examples of the mixed polymer are polyamide/polyester mixed polymer, polyamide/polyphenyleneoxide mixed polymer, polyamide/polycarbonate mixed polymer, polyamide/polyolefin mixed polymer, polyamide/styrene/acrylonitrile mixed polymer, polyamide/polyacrylate mixed polymer, polyamide/silicone mixed polymer and so on. These polyamide resins may be used singularly or plurally.

The polyphenylene sulfide resin is a polymer mainly having a repeated unit of thiophenylene group represented by "-φ-S-" styled as PPS whose φ is a phenylene group having substitutional groups or having no substitutional group. The polyphenylene sulfide resin is polymerized from a monomer synthesized by reacting p-dichlorobenzene and alkali sulfide under high temperature and high pressure. The resin is broadly classified into two types. One type is a straight-chain-type resin having the desired polymerization degree that the monomers are merely polymerized under the presence of an auxiliary initiator. The other type is a crosslinking-type resin that prepolymers are crosslinked by heat under presence of oxygen. Especially, the straight-chain-type resin is preferable because the transmissivity thereof is sufficient. Although melting viscosity of the polyphenylene sulfide resin (PPS) is not intended to be limited if the polyphenylene sulfide resin can be knead with melting, generally the resin having the melting viscosity ranging from 5 to 2000 Pa·s is used. It is preferable that the melting viscosity thereof is ranging from 100 to 600 Pa·s.

The polyphenylene sulfide resin is allowed to use polymer alloy. Examples of the polymer alloy are PPS/polyolefin-type alloy, PPS/polyamide-type alloy, PPS/polyester-type alloy, PPS/polycarbonate-type alloy, PPS/polyphenylene ether-type alloy, PPS/liquid crystal polymer-type alloy, PPS/polyimide-type alloy, and PPS/polysulfone-type alloy. The polyphenylene sulfide resin has relevant properties for electronic parts, automotive parts and so on.

Examples of the polyester resin are polyethylene terephthalate resin that is prepared by condensation polymerization of terephthalic acid and ethylene glycol, and polybutylene terephthalate resin that is prepared by condensation polymerization of terephthalic acid and butylene glycol. Examples of other polyester resins are copolymers that a part of the terephthalic acid component of the polyester resin, for example 15 mol % or less such as 0.5 to 15 mol %, preferably 5 mol % or less such as 0.5 to 5 mol %, and/or a part of ethylene glycol component or butylene glycol component for example 15 mol % or less such as 0.5 to 15 mol %, preferably 5 mol % or less such as 0.5 to 5 mol %, are substituted for the other components. The polyester resin may be the one that two or more polyester resins are blended.

The polyolefin-type resin is not intended to be limited. Examples of the polyolefin type resin are a homopolymer of alpha olefin such as ethylene, propylene, butene-1,3-methylbutene-1,4-methylpentene-1, octene-1 and so on, and a copolymer of these olefins. Another example of the polyolefin type resin is a copolymer of the above-mentioned olefins and an unsaturated monomer that can co-polymerize with them. The copolymer may be a block copolymer, a random copolymer, or a graft copolymer. Concrete examples of the polyolefin-type resin are polyethylene type resin such as high-density polyethylene, middle-density polyethylene, low-density polyethylene, low-density polyethylene having a straight chain, ethylene-vinyl acetate copolymer, ethylene-ethyl acrylate copolymer and so on; polypropylene-type resin such as propylene homopolymer, propylene-ethylene block copolymer, or propylene-ethylene random copolymer, propylene-ethylene-butene-1 copolymer and so on; polybutene-1; poly (4-methylpentene-1). These polyolefin type resins can be used singularly or plurally. It is preferable that the polyolefin-type resin is the polypropylene resin and/or the polyethylene resin, preferably the polypropylene-type resin. The polypropylene-type resin is not intended to be limited and is used within extensive molecular weight.

Incidentally, the polyolefin-type resin may be an acid-denaturalized polyolefin that is denaturalized by an unsaturated carboxylic acid or the derivative thereof; a foam resin prepared by using a foaming agent such as foam polypropylene. And the polyolefin-type resin may include ethylene-alpha-olefin-type copolymer rubber; ethylene-alpha-olefin-non-conjugated diene-type compound copolymer such as ethylene propylene diene-type monomer (EPDM) and so on; ethylene-aromatic monovinyl compound-conjugated diene-type compound copolymer rubber, or hydrogenated rubber of the above.

Polycarbonate is a thermoplastic resin having bindings of carbonic ester in principle chain thereof. Polycarbonate has an excellent mechanical property, heat resistance, cold resistance, electrical property, transparency and so on and is a typical engineering plastic. Polycarbonate that is industrially manufactured at present is aromatic polycarbonate made from bisphenol A, and examples of method for manufacturing thereof are a method using phosgene and a method by ester interchange. The molecule thereof has a liner chemical structure that many carbonic ester groups having aromatic hydrocarbon group are bound. The chemical structure has bulky benzene rings and flexible carbonate groups in the principle chain. The bulky benzene rings accomplish high temperature for thermal deforming and excellent physical or mechanical properties. The flexible carbonate groups contribute to moldability and flexibility, however, easily cause hydrolysis by alkali.

For preparing the molded workpiece, the laser-transmissible resin may include various additives if necessary. Examples of the additive are colorant, a reinforce, a filler, an ultraviolet-absorptive agent or a light-stabilizer, an antioxidant, an antibacterial agent, a fungicide, a flame retarder, an auxiliary coloring agent, a dispersant, a stabilizer, a plasticizer, a reforming agent, an antistatic agent, a lubricant, a mold releasing agent, a crystallization accelerator, a crystalline germ agent, and so on.

The structure and the hue of the colorant is not intended to be limited if the colorant can satisfy the above-mentioned condition about the molded workpiece. Concrete examples of the colorant are various organic dyes or pigments of azomethine-type, anthraquinone-type, quinacridone-type, dioxazine-type, diketopyrrolopyrrole-type, anthrapyridone-type, isoindolinone-type, indanthrone-type, perinone-type, perylene-type, indigo-type, thioindigo-type, quinophthalone-type, quinoline-type, and triphenylmethane-type.

If the absorbent used for the molded workpiece is a black absorbent or a dark-colored absorbent, an excellent black molded workpiece is obtained by mixing the black colorant according to the hue and the concentration of the absorbent. Examples of mixed black colorant are a combination of blue colorant, yellow colorant and red colorant, a combination of violet colorant and yellow colorant, a combination of green colorant and red colorant. If the absorbent is a pastel-colored absorbent, a colored molded workpieces of various colors are obtained by combining with the colorant suitably.

Furthermore, the laser-transmissible resin may include a white pigment such as titanium oxide, zinc white, calcium carbonate, alumina white; or an organic white pigment. Chromatic pigments may be prepared by combining achromatic pigments with the organic dyes or pigments.

The reinforcer is not intended to be limited as long as it can be used for general reinforcement of a synthetic resin. Examples of the reinforcer are a glass fiber, a carbon fiber, other inorganic fibers, and other organic fibers made from aramid, polyphenylene sulfide resin, polyamide, polyester, liquid crystal polymer and so on. For the reinforcement of the resin that requires a property of transparence, the glass fiber is preferable. In order to practically use the glass fiber, it is preferable that the length of the glass fiber is ranging from 2 to 15 mm and the diameter thereof is ranging from 1 to 20 microns. A shape of the glass fiber is not intended to be limited. Examples of the shape thereof are a roving, a milled fiber and so on. The glass fiber can be used singularly or plurally. The content of the glass fiber is preferably ranging from 5 to 120 parts by weight to the laser-transmissible-absorptive molded workpiece of 100 parts by weight. If the content of the glass fiber is less than 5 parts by weight, it is difficult to achieve sufficient reinforcement effect of the glass fiber. If the content is more than 120 parts by weight, moldability tends to decrease. The content of the glass fiber is preferably ranging from 10 to 60 parts by weight, further preferably ranging from 20 to 50 parts by weight.

Examples of the filler are a plate-shaped filler such as mica, sericite and glass flakes; silicate such as talc, kaolin, clay, wollastonite, bentonite, asbestos and alumina silicate; metal oxide such as alumina, silicon oxide, magnesium oxide, zirconium oxide and titanium oxide; carbonate such as calcium carbonate, magnesium carbonate and dolomite; sulfate such as calcium sulfate and barium sulfate; granular filler such as glass beads, ceramic beads, boron nitride and silicon carbide.

Examples of the ultraviolet-absorptive agent or the light-stabilizer are a benzotriazole-type compound, a benzophenone-type compound, a salicylate-type compound, a cyanoacrylate-type compound, a benzoate-type compound, an oxanilide-type compound, a hindered amine-type compound and a nickel complex salt.

Examples of the antioxidant are a phenol-type compound, a phosphorus compound, a sulfur compound and a thioether-type compound.

Examples of the antibacterial agent and the fungicide are 2-(4'-thiazolyl)benzimidazole, 10,10'-oxybisphenoxyarsine, N-(fluorodichloromethylthio)phthalimide and zinc bis(2-pyridylthio-1-oxide).

Examples of the flame retarder are a halogen-contained compound such as tetrabromobisphenol A derivative, hexabromodiphenylether and tetrabromophthalic anhydride; a phosphorus-contained compound such as triphenylphosphate, triphenylphosphite, red phosphorus and ammonium polyphosphate; a nitrogen-contained compound such as urea and guanidine; a silicon-contained compound such as silicon oil, organic silane and aluminum silicate; an antimony compound such as antimony trioxide and antimony phosphate.

The molded workpiece may be prepared by using a masterbatch of the desired colored thermoplastic resin composition. The masterbatch may be prepared by an arbitrary method. For example, the masterbatch may be prepared by mixing the colorant and a resin powder or pellets as the base of the masterbatch with a mixer such as a tumbler, a supermixer and so on, heating and melting the mixture with an extruder, a batch-type kneader or a roll-type kneader and so on, and then forming pellets or grain.

Molding process of the molded workpiece may be executed by general various procedures. For example, it may be executed by using the colored pellets with a processing machine such as an extruder, an injection molding machine, a roll mill and so on. Another molding process may be executed with the proper mixer by mixing the pellets or the grain made from a transparent resin, a granulated colorant, and if necessary various additives. Then, the mixture is molded with a processing machine. Another molding process may be executed by adding the colorant to a monomer including a proper polymerization catalyst, polymerizing the mixture to obtain the desired resin, and then molding the obtained resin by a proper procedure. Examples of the molding procedure may be general molding procedures such as injection molding, extrusion molding, compression molding, foaming molding, blow molding, vacuum molding, injection blow molding, rotational molding, calendaring molding, solution casting and so on. By these molding procedures, the molded workpieces having various shapes are obtained.

Following examples describe embodiments concretely. The present invention is not intended to be limited to specific embodiments.

Figure 4:
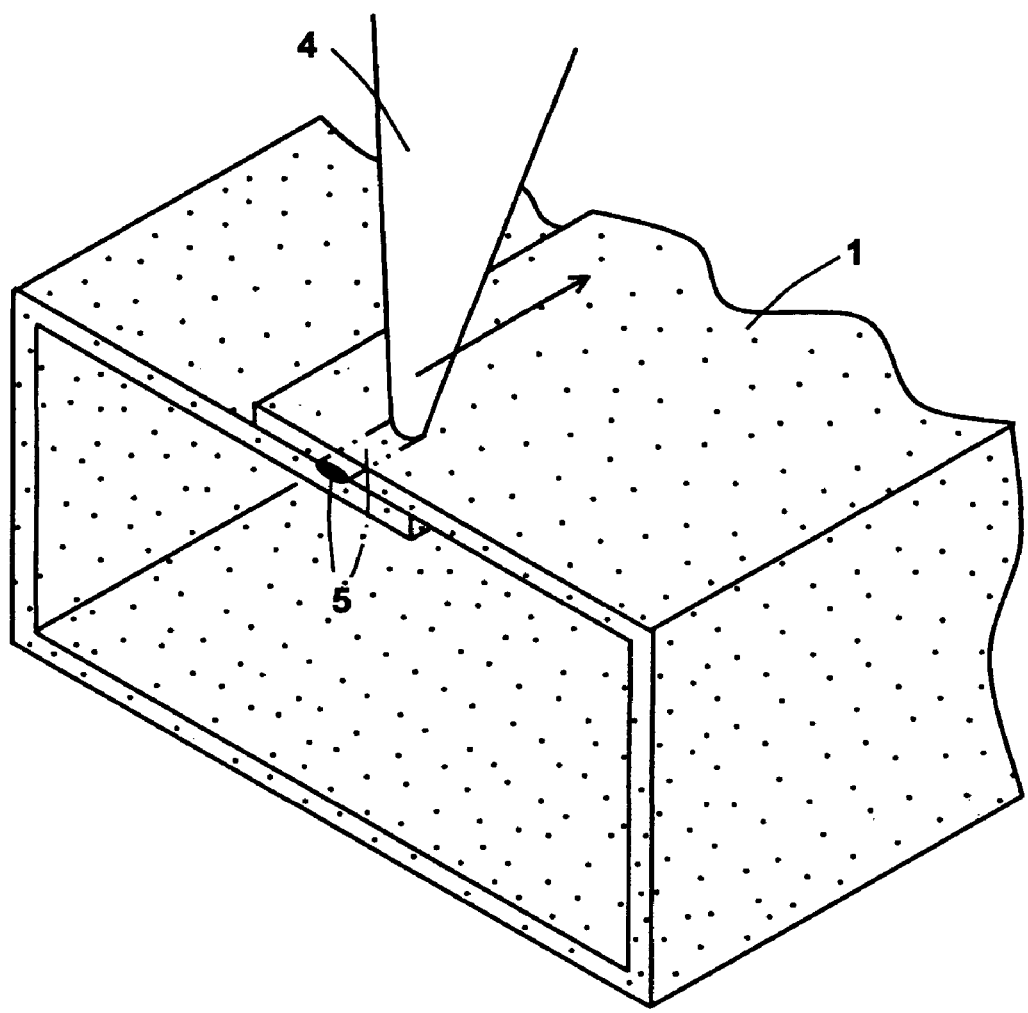
FIG. 4 shows one embodiment of preparing a laser-welded article to which the present invention is applied, by welding the single folded laser-transmissible-absorptive molded workpiece using the laser.
Figure 5:
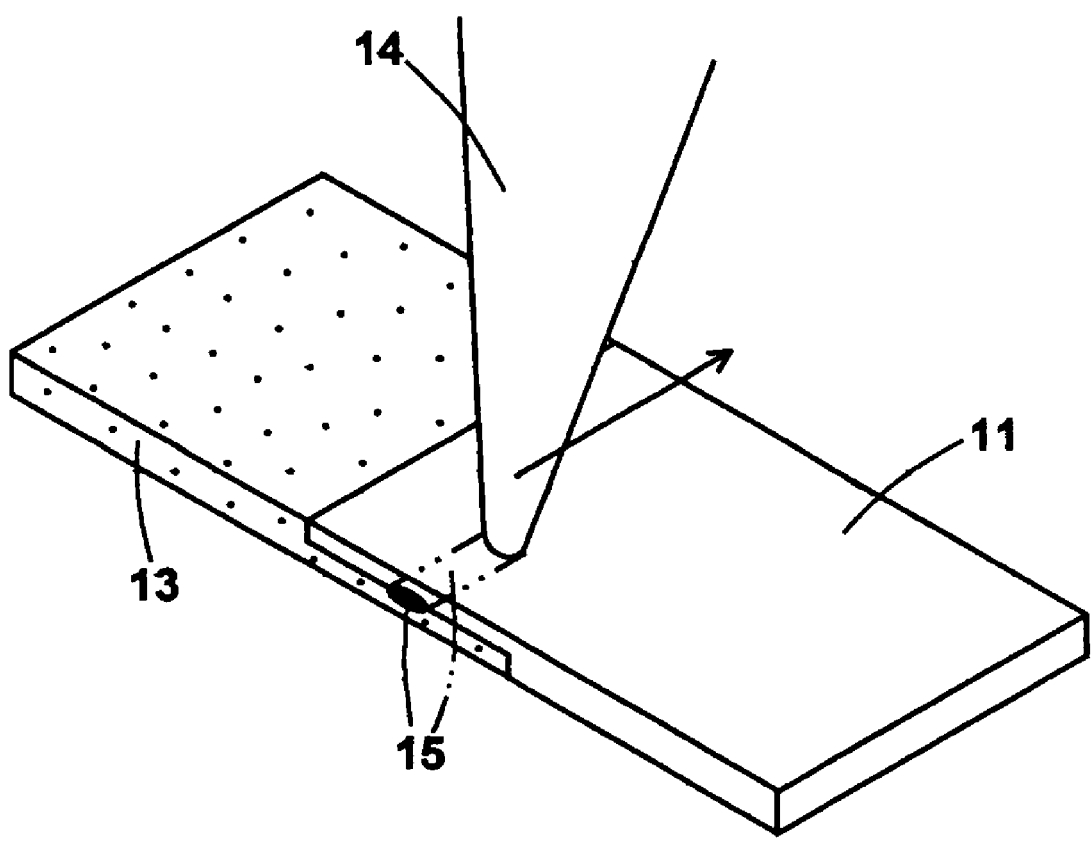
FIG. 5 shows an embodiment of preparing a laser-welded article to which the present invention is not applied, by welding the laser-transmissible molded workpiece and the laser-absorptive molded workpiece using the laser.

The laser-transmissible-absorptive molded workpieces were manufactured experimentally by using a polyamide 66 resin, and then the molded workpieces were piled as shown in FIG. 1, FIG. 3 or FIG. 4 and were welded by the laser. Examples of experimentally manufacturing the laser-welded articles to which the present invention was applied are shown in Examples 1 to 14. Examples of manufacturing the laser-welded articles to which the present invention was not applied are shown in Comparative Examples 1 to 3.

EXAMPLE 1

(1-a) Preparation of Laser-Transmissible-Absorptive Molded Workpieces 1 and 2

499.9 g of a polyamide 66 resin of catalog No. ZYTEL (the registered trademark) 101NC available from Du Pont and 0.1 g of nigrosine of catalog No. NUBIAN (the registered trademark) BLACK PA9801 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(1-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

Incidentally the absorption coefficient: $\epsilon_d$ of the nigrosine of NUBIAN (the registered trademark) BLACK PA 9801 in DMF was $6.0 \times 10^3$ (ml/g·cm).

The absorbance and the absorption coefficient of the laser-transmissible-absorptive molded workpieces evaluated by following procedures are shown in Table 1. The result of the laser-welding is also shown in Table 1.

EXAMPLE 2

(2-a) Preparation of Laser-Transmissible-Absorptive Molded Workpieces 1 and 2

499.8 g of a polyamide 66 resin of catalog No. ZYTEL (the registered trademark) 101NC available from Du Pont and 0.2 g of nigrosine of catalog No. NUBIAN (the registered trademark) BLACK PA9801 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 0.5 mm were prepared.

(2-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 2.5 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 1. The result of the laser-welding is also shown in Table 1.

EXAMPLE 3

(3-a) Preparation of Laser-Transmissible-Absorptive Molded Workpieces 1 and 2

499.5 g of a polyamide 66 resin of catalog No. ZYTEL (the registered trademark) 101NC available from Du Pont and 0.5 g of nigrosine of catalog No. NUBIAN (the registered trademark) BLACK PA9801 available from Orient Chemical Industries, Ltd. were added in a tumbler made of stainless steel according to a composition ratio shown in Table 1 and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 0.25 mm were prepared.

(3-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 6.5 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 1. The result of the laser-welding is also shown in Table 1.

EXAMPLE 4

(4-a) Preparation of Laser-Transmissible-Absorptive Molded Workpieces 1 and 2

499.95 g of a polyamide 66 resin of catalog No. ZYTEL (the registered trademark) 101NC available from Du Pont and 0.05 g of nigrosine of catalog No. NUBIAN (the registered trademark) BLACK PA9801 available from Orient Chemical Industries, Ltd. were added in a tumbler made of stainless steel according to a composition ratio shown in Table 1 and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(4-b) Manufacture of Laser-Welded Article

Then, the laser-transmissible-absorptive molded workpieces 1 and 2 were piled and put together as shown in FIG. 1.

Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 1. The result of the laser-welding is also shown in Table 1.

EXAMPLE 5

(5-a$^1$) Preparation of Laser-Transmissible-Absorptive Molded Workpiece 1

499.8 g of a polyamide 66 resin of catalog No. ZYTEL (the registered trademark) 101NC available from Du Pont, 0.1 g of nigrosine of catalog No. NUBIAN (the registered trademark) BLACK PA9801 available from Orient Chemical Industries, Ltd., and 0.1 g of a black combination dye that an anthraquinone-type blue oil-soluble dye of C.I. Solvent Green 87, a perinone-type red oil-soluble dye of C.I. Solvent Red 179, and an anthraquinone-type yellow oil-soluble dye of C.I. Solvent Yellow 163 were combined in a weight ratio of 13:20:7, were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 80 mm, the width of 50 mm and the thickness of 1 mm was prepared.

(5-a$^2$) Preparation of Laser-Transmissible-Absorptive Molded Workpiece 2

499.8 g of a polyamide 66 resin of catalog No. ZYTEL (the registered trademark) 101NC available from Du Pont and 0.2 g of nigrosine of catalog No. NUBIAN (the registered trademark) BLACK PA9801 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 2 having the length of 80 mm, the width of 50 mm and the thickness of 1 mm was prepared.

(5-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

The absorbance and the absorption coefficient of the laser-transmissible-absorptive molded workpiece evaluated by following procedures are shown in Table 1. The result of the laser-welding is also shown in Table 1.

EXAMPLE 6

(6-a) Preparation of Single Laser-Transmissible-Absorptive Molded Workpiece 1

499.9 g of a polyamide 66 resin of catalog No. ZYTEL (the registered trademark) 101NC available from Du Pont and 0.1 g of nigrosine of catalog No. NUBIAN (the registered trademark) BLACK PA9801 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 50 mm, the width of 230 mm and the thickness of 1 mm were prepared. The obtained workpiece 1 was curled to obtain a cylinder-shape workpiece having 70 mm of diameter of which 10 mm of both end portions were overlapped.

(6-b) Manufacture of Laser-Welded Article

Then, both end portions of the laser-transmissible-absorptive molded workpiece 1 were overlapped and put together as shown in FIG. 3. Using the diode laser machine having 10 W of the output power that is available from Fine Device Co., Ltd., the scanning laser beam 4 of the wavelength of 940 nm was continuously irradiated from the outside of the workpiece towards the put portion under 1 mm/sec. of scanning speed for 20 mm. Then, a laser-welded article joined uniformly was obtained.

The absorbance and the absorption coefficient of the laser-transmissible-absorptive molded workpiece evaluated by following procedures are shown in Table 1. The result of the laser-welding is also shown in Table 1.

EXAMPLE 7

(7-a) Preparation of Laser-Transmissible-Absorptive Molded Workpieces 1 and 2

499.95 g of a polyamide 66 resin of catalog No. ZYTEL (the registered trademark) 101NC available from Du Pont and 0.05 g of nigrosine of catalog No. NUBIAN (the registered trademark) BLACK PA9801 available from Orient Chemical Industries, Ltd. were added in a tumbler made of stainless steel and were mixed with stirring for 1 hour. The obtained mixture was molded at 280° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 3 mm were prepared.

(7-b) Manufacture of Laser-Welded Article

Then, the laser-transmissible-absorptive molded workpieces 1 and 2 were piled and put together as shown in FIG. 1.

Using the diode laser machine having 70 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 2.2 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 1. The result of the laser-welding is also shown in Table 1.

EXAMPLE 8

(8-a) Preparation of Single Laser Transmissible-Absorptive Molded Workpiece 1

499.8 g of a polyamide 66 resin of catalog No. ZYTEL (the registered trademark) 101NC available from Du Pont and 0.2 g of nigrosine of catalog No. NUBIAN (the registered trademark) BLACK PC0850 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a sheet having the length of 50 mm, the width of 170 mm and the thickness of 1 mm was prepared. The sheet was bent inward in the direction of the width to 20 mm, 40 mm, 40 mm, 40 mm, 30 mm in order, and 10 mm of both end portions of the sheet were overlapped. Then the laser-transmissible-absorptive molded workpiece 1 having square pole-shape was prepared.

(8-b) Manufacture of Laser-Welded Article

Then, both end portions of the laser-transmissible-absorptive molded workpiece 1 were overlapped and put together as shown in FIG. 4. Using the diode laser machine having 10 W of the output power that is available from Fine Device Co., Ltd., the scanning laser beam 4 of the wavelength of 940 nm was continuously irradiated from the outside of the workpiece towards the put portion under 1 mm/sec. of scanning speed for 20 mm. Then, a laser-welded article joined uniformly was obtained.

Incidentally, the absorption coefficient: $\epsilon$ of the nigrosine of NUBIAN (the registered trademark) BLACK PC0850 in DMF was $4.8 \times 10^3$ (ml/g·cm).

The absorbance and the absorption coefficient of the laser-transmissible-absorptive molded workpiece evaluated by following procedures are shown in Table 2. The result of the laser-welding is also shown in Table 2.

EXAMPLE 9

(9-a) Preparation of Laser-Transmissible-Absorptive Molded Workpieces 1 and 2

499.0 g of a polyamide 66 resin of catalog No. ZYTEL (the registered trademark) 101NC available from Du Pont and 1.0 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(9-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

Incidentally, the absorption coefficient: $\epsilon_d$ of the nigrosine of CRAMITY (the registered trademark) 81 available from Orient Chemical Industries, Ltd. in DMF was $5.9 \times 10^3$ (ml/g·cm).

The absorbance and the absorption coefficient of the laser-transmissible-absorptive molded workpieces evaluated by following procedures are shown in Table 2. The result of the laser-welding is also shown in Table 2.

EXAMPLE 10

(10-a) Preparation of Laser-Transmissible-Absorptive Molded Workpieces 1 and 2

498.0 g of a polyamide 66 resin of catalog No. ZYTEL (the registered trademark) 101NC available from Du Pont and 2.0 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(10-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 2. The result of the laser-welding is also shown in Table 2.

EXAMPLE 11

(11-a) Preparation of Laser-Transmissible-Absorptive Molded Workpieces 1 and 2

497.5 g of a polyamide 66 resin of catalog No. ZYTEL (the registered trademark) 101NC available from Du Pont and 2.5 g of nigrosine of catalog No. CRAMITY (the registered trademark) 81 available from Orient Chemical Industries, Ltd. were added in a tumbler of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(11-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 2. The result of the laser-welding is also shown in Table 2.

EXAMPLE 12

(12-a$^1$) Preparation of
Laser-Transmissible-Absorptive Molded Workpiece
1

499.5 g of a polyamide 66 resin of catalog No. ZYTEL (the registered trademark) 101NC available from Du Pont and 0.5 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 80 mm, the width of 50 mm and the thickness of 1 mm was prepared.

(12-a$^2$) Preparation of
Laser-Transmissible-Absorptive Molded Workpiece
2

499.5 g of a polyamide 66 resin of catalog No. ZYTEL (the registered trademark) 101NC available from Du Pont and 0.5 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 2 having the length of 80 mm, the width of 50 mm and the thickness of 2 mm was prepared.

(12-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 2 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 2. The result of the laser-welding is also shown in Table 2.

EXAMPLE 13

(13-a$^1$) Preparation of
Laser-Transmissible-Absorptive Molded Workpiece
1

499 g of a polyamide 66 resin of catalog No. ZYTEL (the registered trademark) 101NC available from Du Pont and 1.0 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 80 mm, the width of 50 mm and the thickness of 1 mm was prepared.

(13-a$^2$) Preparation of
Laser-Transmissible-Absorptive Molded Workpiece
2

498.5 g of a polyamide 66 resin of catalog No. ZYTEL (the registered trademark) 101NC available from Du Pont and 2.5 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 2 having the length of 80 mm, the width of 50 mm and the thickness of 1.5 mm was prepared.

(13-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 2 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 2. The result of the laser-welding is also shown in Table 2.

EXAMPLE 14

(14-a$^1$) Preparation of Laser-Transmissible-Absorptive Molded Workpiece 1

499 g of a polyamide 66 resin of catalog No. ZYTEL (the registered trademark) 101NC available from Du Pont and 1.0 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 80 mm, the width of 50 mm and the thickness of 1 mm was prepared.

(14-a$^2$) Preparation of Laser-Transmissible-Absorptive Molded Workpiece 2

499.5 g of a polyamide 66 resin of catalog No. ZYTEL (the registered trademark) 101NC available from Du Pont and 0.5 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, a laser-transmissible-absorptive molded workpiece 2 having the length of 80 mm, the width of 50 mm and the thickness of 1.5 mm was prepared.

(14-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 2. The result of the laser-welding is also shown in Table 2.

COMPARATIVE EXAMPLE 1

(1-A) Preparation of Comparative Molded Workpieces 495 g of a polyamide 66 resin of catalog No. ZYTEL (the registered trademark) 101NC available from Du Pont and 5.0 g of nigrosine of catalog No. NUBIAN (the registered trademark) BLACK PA9801 available from Orient Chemical Industries, Ltd. were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, two comparative molded workpieces having the length of 80 mm, the width of 50 mm and the thickness of 1 mm were prepared.

(1-B) Manufacture of Laser-Welded Article

Then, the comparative molded workpieces were piled and put together. Using the diode laser machine having 10 W of the output power that is available from Fine Device Co., Ltd., the scanning laser beam 4 of the wavelength of 940 nm was continuously irradiated from the upper side of one comparative molded workpiece towards the put portion under 1 mm/sec. of scanning speed for 20 mm. However, a laser-welded article was not obtained.

The absorbance and the absorption coefficient of the comparative molded workpieces evaluated by following procedures are shown in Table 2. The result of the laser-welding is also shown in Table 2.

COMPARATIVE EXAMPLE 2

(2-A) Preparation of Conventional Laser-Transmissible Molded Workpiece 500 g of a polyamide 66 resin of catalog No. ZYTEL (the registered trademark) 101NC available from Du Pont was added in a tumbler made of stainless steel and was mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, two laser-transmissible molded workpieces having the length of 80 mm, the width of 50 mm and the thickness of 1 mm were prepared.

(2-B) Manufacture of Laser-Welded Article

Then, the laser-transmissible molded workpieces were piled and put together. Using the diode laser machine having 10 W of the output power that is available from Fine Device Co., Ltd., the scanning laser beam 4 of the wavelength of 940 nm was continuously irradiated from the upper side of one laser-transmissible molded workpiece towards the put portion under 1 mm/sec. of scanning speed for 20 mm. However, a laser-welded article was not obtained.

The absorbance and the absorption coefficient of the laser-transmissible molded workpieces evaluated by following procedures are shown in Table 2. The result of the laser-welding is also shown in Table 2.

COMPARATIVE EXAMPLE 3

(3-A) Preparation of Comparative Molded Workpieces 1 and 2

499 g of a polyamide 66 resin of catalog No. ZYTEL (the registered trademark) 101NC available from Du Pont and 1 g of carbon black of catalog No. #CB960 available from Mitsubishi Chemical Corporation were added in a tumbler made of stainless steel and were mixed with stirring for 1 hour. The obtained mixture was molded at 270° C. of temperature of a cylinder and 60° C. of temperature of a metal mold with general procedures using an injection molding machine of catalog No. Si-50 that is available from Toyo Machinery & Metal Co., Ltd. Then, two comparative molded workpieces having the length of 80 mm, the width of 50 mm and the thickness of 1 mm were prepared.

(3-B) Manufacture of Laser-Welded Article

Then, the comparative molded workpieces 1 and 2 were piled and put together. Using the diode laser machine having 15 W of the output power that is available from Fine Device Co., Ltd., the scanning laser beam 4 of the wavelength of 940 nm was continuously irradiated from the upper side of comparative molded workpiece 1 towards the put portion under 1 mm/sec. of scanning speed for 20 mm. However, a laser-welded article was not obtained.

The absorbance and the absorption coefficient of the laser-transmissible molded workpieces evaluated by following procedures are shown in Table 2. The result of the laser-welding is also shown in Table 2.

The laser-transmissible-absorptive molded workpieces were manufactured experimentally by using a fiber-reinforced polyamide 6 resin, and then the molded workpieces were piled as shown in FIG. 1 and were welded by the laser. Examples of experimentally manufacturing the laser-welded articles to which the present invention was applied are shown in Examples 15 to 18. Examples of the laser-welded articles to which the present invention was not applied are shown in Comparative Examples 4 to 5.

EXAMPLE 15

(15-a) Preparation of Laser-Transmissible-Absorptive Molded Workpieces 1 and 2

499.9 g of a fiber-reinforced polyamide 6 resin of catalog No. ZYTEL (the registered trademark) 73G30L available from Du Pont and 0.1 g of a naphthalocyanine of catalog No. YKR-5010 available from Yamamoto Chemicals, Inc. were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(15-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 3. The result of the laser-welding is also shown in Table 3.

EXAMPLE 16

(16-a) Preparation of Laser-Transmissible-Absorptive Molded Workpieces 1 and 2

499.99 g of a fiber-reinforced polyamide 6 resin of catalog No. ZYTEL (the registered trademark) 73G30L available from Du Pont and 0.01 g of nigrosine of catalog No. CRAM-ITY (the registered trademark) 81 available from Orient Chemical Industries, Ltd. were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 2 mm were prepared.

(16-b) Manufacture of Laser-Welded Article

Then, the laser-transmissible-absorptive molded workpieces 1 and 2 were piled and put together as shown in FIG. 1. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 0.50 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 3. The result of the laser-welding is also shown in Table 3.

EXAMPLE 17

(17-a) Preparation of Laser-Transmissible-Absorptive Molded Workpieces 1 and 2

499.975 g of a fiber-reinforced polyamide 6 resin of catalog No. ZYTEL (the registered trademark) 73G30L available from Du Pont and 0.025 g of nigrosine of catalog No. CRAM-ITY (the registered trademark) 81 available from Orient Chemical Industries, Ltd. were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 2 mm were prepared.

(17-b) Manufacture of Laser-Welded Article

Then, the laser-transmissible-absorptive molded workpieces 1 and 2 were piled and put together as shown in FIG. 1. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 0.60 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 3. The result of the laser-welding is also shown in Table 3.

EXAMPLE 18

(18-$a^1$) Preparation of Laser-Transmissible-Absorptive Molded Workpiece 1

499.975 g of a fiber-reinforced polyamide 6 resin of catalog No. ZYTEL (the registered trademark) 73G30L available from Du Pont and 0.025 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 80 mm, the width of 50 mm and the thickness of 2 mm was prepared.

(18-a$^2$) Preparation of Laser-Transmissible-Absorptive Molded Workpiece 2

499.95 g of a fiber-reinforced polyamide 6 resin of catalog No. ZYTEL (the registered trademark) 73G30L available from Du Pont and 0.05 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, a laser-transmissible-absorptive molded workpiece 2 having the length of 80 mm, the width of 50 mm and the thickness of 3 mm was prepared.

(18-b) Manufacture of Laser-Welded Article

Then, the laser-transmissible-absorptive molded workpieces 1 and 2 were piled and put together as shown in FIG. 1. Using the diode laser machine having 50 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 0.90 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 3. The result of the laser-welding is also shown in Table 3.

COMPARATIVE EXAMPLE 4

(4-A) Preparation of Conventional Laser-Transmissible Molded Workpieces 500 g of a fiber-reinforced polyamide 6 resin of catalog No. ZYTEL (the registered trademark) 73G30L available from Du Pont was added in a tumbler made of stainless steel and was mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, two laser-transmissible molded workpieces having the length of 80 mm, the width of 50 mm and the thickness of 1 mm were prepared.

(4-B) Manufacture of Laser-Welded Article

Then, the laser-transmissible molded workpieces were piled and put together. Using the diode laser machine having 30 W of the output power that is available from Fine Device Co., Ltd., the scanning laser beam 4 of the wavelength of 940 nm was continuously irradiated from the upper side of one laser-transmissible molded workpiece towards the put portion under 1 mm/sec. of scanning speed for 20 mm. However, a laser-welded article was not obtained.

The absorbance and the absorption coefficient of the laser-transmissible-absorptive molded workpieces evaluated by following procedures are shown in Table 3. The result of the laser-welding is also shown in Table 3.

COMPARATIVE EXAMPLE 5

(5-A) Preparation of Conventional Laser-Transmissible Molded Workpieces 499 g of a fiber-reinforced polyamide 6 resin of catalog No. ZYTEL (the registered trademark) 73G30L available from Du Pont and 1.0 g of a carbon black of catalog No. #CB960 available from Mitsubishi Chemical Corporation were added in a tumbler made of stainless steel and were mixed with stirring for 1 hour. The obtained mixture was molded at 280° C. of temperature of a cylinder and 80° C. of temperature of a metal mold with general procedures using an injection molding machine of catalog No. Si-50 that is available from Toyo Machinery & Metal Co., Ltd. Then, two laser-transmissible molded workpieces having the length of 80 mm, the width of 50 mm and the thickness of 1 mm were prepared.

(5-B) Manufacture of Laser-Welded Article

Then, the laser-transmissible molded workpieces were piled and put together. Using the diode laser machine having 30 W of the output power that is available from Fine Device Co., Ltd., the scanning laser beam 4 of the wavelength of 940 nm was continuously irradiated from the upper side of one laser-transmissible molded workpiece towards the put portion under 1 mm/sec. of scanning speed for 20 mm. However, a laser-welded article was not obtained.

The absorbance and the absorption coefficient of the laser-transmissible molded workpieces evaluated by following procedures are shown in Table 3. The result of the laser-welding is also shown in Table 3.

The laser-transmissible-absorptive molded workpieces were manufactured experimentally by using a polycarbonate resin, and then the molded workpieces were piled as shown in FIG. 1 and were welded by the laser. Examples of experimentally manufacturing the laser-welded articles to which the present invention was applied are shown in Examples 19 to 23. Examples of the laser-welded articles to which the present invention was not applied are shown in Comparative Examples 6 to 7.

EXAMPLE 19

(19-a) Preparation of Laser-Transmissible-Absorptive Molded Workpieces 1 and 2

497.5 g of a polycarbonate resin of catalog No. Panlite L1225Y available from TEIJIN Limited and 2.5 g of nigrosine of catalog No. NUBIAN (the registered trademark) BLACK PC0850 available from Orient Chemical Industries, Ltd. were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(19-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

Incidentally the absorption coefficient: $\epsilon$ of nigrosine of NUBIAN (the registered trademark) BLACK PC0850 to ray of 940 nm in DMF was $4.8 \times 10^3$ (ml/g·cm).

The absorbance and the absorption coefficient of the laser-transmissible-absorptive molded workpieces evaluated by following procedures are shown in Table 4. The result of the laser-welding is also shown in Table 4.

EXAMPLE 20

(20-a) Preparation of Laser-Transmissible-Absorptive Molded Workpieces 1 and 2

498.5 g of a polycarbonate resin of catalog No. Panlite L1225Y available from TEIJIN Limited and 1.5 g of nigrosine of catalog No. NUBIAN (the registered trademark) BLACK PC0850 available from Orient Chemical Industries, Ltd. were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(20-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 4. The result of the laser-welding is also shown in Table 4.

EXAMPLE 21

(21-a) Preparation of Laser-Transmissible-Absorptive Molded Workpieces 1 and 2

499 g of a polycarbonate resin of catalog No. Panlite L1225Y available from TEIJIN Limited and 1.0 g of nigrosine of catalog No. NUBIAN (the registered trademark) BLACK PC0850 available from Orient Chemical Industries, Ltd. were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(21-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 4. The result of the laser-welding is also shown in Table 4.

EXAMPLE 22

(22-a) Preparation of Laser-Transmissible-Absorptive Molded Workpieces 1 and 2

499.75 g of a polycarbonate resin of catalog No. Panlite L1225Y available from TEIJIN Limited and 0.25 g of nigrosine of catalog No. NUBIAN (the registered trademark) BLACK PC0850 available from Orient Chemical Industries, Ltd. were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(22-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 4. The result of the laser-welding is also shown in Table 4.

EXAMPLE 23

(23-a) Preparation of Laser-Transmissible-Absorptive Molded Workpieces 1 and 2

498 g of a polycarbonate resin of catalog No. Panlite L1225Y available from TEIJIN Limited, 1.0 g of nigrosine of catalog No. NUBIAN (the registered trademark) BLACK PC0850 available from Orient Chemical Industries, Ltd., and 1.0 g of a black combination dye that an anthraquinone-type blue oil-soluble dye of C.I. Solvent Green 87, a perinone-type red oil-soluble dye of C.I. Solvent Red 179, and an anthraquinone-type yellow oil-soluble dye of C.I. Solvent Yellow 163 were combined in a weight ratio of 13:20:7, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(23-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 4. The result of the laser-welding is also shown in Table 4.

EXAMPLE 24

(24-$a^1$) Preparation of Laser-Transmissible-Absorptive Molded Workpiece 1

498 g of a polycarbonate resin of catalog No. Panlite L1225Y available from TEIJIN Limited, 1.0 g of nigrosine of catalog No. NUBIAN (the registered trademark) BLACK PC0850 available from Orient Chemical Industries, Ltd., and 1.0 g of a black combination dye that an anthraquinone-type blue oil-soluble dye of C.I. Solvent Green 87, a perinone-type red oil-soluble dye of C.I. Solvent Red 179, and an anthraquinone-type yellow oil-soluble dye of C.I. Solvent Yellow 163 were combined in a weight ratio of 13:20:7, were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, a laser-transmissible-absorptive molded workpiece 1 having the length of 80 mm, the width of 50 mm and the thickness of 1 mm was prepared.

(24-$a^2$) Preparation of Laser-Transmissible-Absorptive Molded Workpiece 2

498.75 g of a polycarbonate resin of catalog No. Panlite L1225Y available from TEIJIN Limited and 1.25 g of nigrosine of catalog No. NUBIAN (the registered trademark) BLACK PC0850 available from Orient Chemical Industries, Ltd. were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, a laser-transmissible-absorptive molded workpiece 2 having the length of 80 mm, the width of 50 mm and the thickness of 2 mm was prepared.

(24-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 4. The result of the laser-welding is also shown in Table 4.

COMPARATIVE EXAMPLE 6

(6-A) Preparation of Conventional Laser-Transmissible Molded Workpieces 500 g of a polycarbonate resin of catalog No. Panlite L1225Y available from TEIJIN Limited was added in a tumbler made of stainless steel and was mixed with stirring for 1 hour. The obtained mixture was molded at 280° C. of temperature of a cylinder and 70° C. of temperature of a metal mold with general procedures using on injection molding machine of catalog No. Si-50 that is available from Toyo Machinery & Metal Co., Ltd. Then, two laser-transmissible molded workpieces having the length of 80 mm, the width of 50 mm and the thickness of 1 mm were prepared.

(6-B) Manufacture of Laser-Welded Article

Then, the laser-transmissible molded workpieces were piled and put together. Using the diode laser machine having 10 W of the output power that is available from Fine Device Co., Ltd., the scanning laser beam 4 of the wavelength of 940 nm was continuously irradiated from the upper side of one laser-transmissible molded workpiece towards the put portion under 1.0 mm/sec. of scanning speed for 20 mm. However, a laser-welded article was not obtained.

The absorbance and the absorption coefficient of the laser-transmissible molded workpieces evaluated by following procedures are shown in Table 4. The result of the laser-welding is also shown in Table 4.

COMPARATIVE EXAMPLE 7

(7-A) Preparation of Conventional Laser-Transmissible Molded Workpieces 499.65 g of a polycarbonate resin of catalog No. Panlite L1225Y available from TEIJIN Limited and 0.35 g of a carbon black of catalog No. MA220 available from Mitsubishi Chemical Corporation were added in a tumbler made of stainless steel and were mixed with stirring for 1 hour. The obtained mixture was molded at 280° C. of temperature of a cylinder and 70° C. of temperature of a metal mold with general procedures using an injection molding machine of catalog No. Si-50 that is available from Toyo Machinery & Metal Co., Ltd. Then, two laser-transmissible molded workpieces having the length of 80 mm, the width of 50 mm and the thickness of 1 mm were prepared.

(7-B) Manufacture of Laser-Welded Article

Then, the laser-transmissible molded workpieces were piled and put together. Using the diode laser machine having 10 W of the output power that is available from Fine Device Co., Ltd., the scanning laser beam 4 of the wavelength of 940 nm was continuously irradiated from the upper side of one laser-transmissible molded workpiece towards the put portion under 1.0 mm/sec. of scanning speed for 20 mm. However, a laser-welded article was not obtained.

The absorbance and the absorption coefficient of the laser-transmissible molded workpieces evaluated by following procedures are shown in Table 4. The result of the laser-welding is also shown in Table 4.

The laser-transmissible-absorptive molded workpieces were manufactured experimentally by using a polybutylene terephthalate resin, and then the molded workpieces were piled as shown in FIG. 1 and were welded by the laser. Examples of experimentally manufacturing the laser-welded articles to which the present invention was applied are shown in Examples 25 to 27. Example of the laser-welded articles to which the present invention was not applied is shown in Comparative Example 8.

EXAMPLE 25

(25-a) Preparation of Laser-Transmissible-Absorptive Molded Workpieces 1 and 2

499.99 g of a polybutylene terephthalate resin of catalog No. NOVADURAN (the registered trademark) MY5008 available from Mitsubishi Engineering-Plastics Corporation and 0.01 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(25-b) Manufacture of Laser-Welded Article

Then, the laser-transmissible-absorptive molded workpieces 1 and 2 were piled and put together as shown in FIG. 1. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 0.6 mm/sec. of scanning speed for 20 mm. Then, a laser-welded article joined uniformly was obtained.

The absorption coefficient: ε of nigrosine of NUBIAN (the registered trademark) BLACK PA9803 to ray of 940 nm in DMF was $6.4 \times 10^3$ (ml/g·cm).

The absorbance and the absorption coefficient of the laser-transmissible-absorptive molded workpieces evaluated by following procedures are shown in Table 5. The result of the laser-welding is also shown in Table 5.

EXAMPLE 26

(26-a) Preparation of Laser-Transmissible-Absorptive Molded Workpieces 1 and 2

499.5 g of a polybutylene terephthalate resin of catalog No. NOVADURAN (the registered trademark) MY5008 available from Mitsubishi Engineering-Plastics Corporation and 0.5 g of nigrosine of catalog No. NUBIAN (the registered trademark) BLACK PA9803 available from Orient Chemical Industries, Ltd. were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(26-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 2.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 5. The result of the laser-welding is also shown in Table 5.

EXAMPLE 27

(27-a) Preparation of Laser-Transmissible-Absorptive Molded Workpieces 1 and 2

499.95 g of a polybutylene terephthalate resin of catalog No. NOVADURAN (the registered trademark) MY5008 available from Mitsubishi Engineering-Plastics Corporation and 0.05 g of nigrosine of catalog No. NUBIAN (the registered trademark) BLACK PA9803 available from Orient Chemical Industries, Ltd. were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(27-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 5. The result of the laser-welding is also shown in Table 5.

COMPARATIVE EXAMPLE 8

(8-A) Preparation of Laser-Transmissible-Absorptive Molded Workpieces 499 g of a polybutylene terephthalate resin of catalog No. NOVADURAN (the registered trademark) MY5008 available from Mitsubishi Engineering-Plastics Corporation and 1 g of nigrosine of catalog No. NUBIAN (the registered trademark) BLACK PA9803 available from Orient Chemical Industries, Ltd. were added in a tumbler made of stainless steel and were mixed with stirring for 1 hour. The obtained mixture was molded at 260° C. of temperature of a cylinder and 60° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 2 mm were prepared.

(8-B) Manufacture of Laser-Welded Article

Then, the laser-transmissible-absorptive molded workpieces 1 and 2 were piled and put together. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 0.6 mm/sec. of scanning speed for 20 mm. However, a laser-welded article was not obtained.

The absorbance and the absorption coefficient of the laser-transmissible-absorptive molded workpieces evaluated by following procedures are shown in Table 5. The result of the laser-welding is also shown in Table 5.

The laser-transmissible-absorptive molded workpieces were manufactured experimentally by using a polyphenylene sulfide resin, and then the molded workpieces were piled as shown in FIG. 1 and were welded by the laser. Examples of experimentally manufacturing the laser-welded articles to which the present invention was applied are shown in Examples 28 to 30. Example of the laser-welded articles to which the present invention was not applied is shown in Comparative Example 9.

EXAMPLE 28

(28-a) Preparation of Laser-Transmissible-Absorptive Molded Workpieces 1 and 2

499.99 g of a polyphenylene sulfide resin of catalog No. FORTRON (the registered trademark) 0220A9 available from Polyplastics Co., Ltd. and 0.01 g of nigrosine of catalog No. CRAMITY (the registered trademark) 81 available from Orient Chemical Industries, Ltd. were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(28-b) Manufacture of Laser-Welded Article

Then, the laser-transmissible-absorptive molded workpieces 1 and 2 were piled and put together as shown in FIG. 1. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 0.3 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 5. The result of the laser-welding is also shown in Table 5.

EXAMPLE 29

(29-a) Preparation of Laser-Transmissible-Absorptive Molded Workpieces 1 and 2

499.5 g of a polyphenylene sulfide resin of catalog No. FORTRON (the registered trademark) 0220A9 available from Polyplastics Co., Ltd. and 0.5 g of nigrosine of catalog No. NUBIAN (the registered trademark) BLACK PA9803 available from Orient Chemical Industries, Ltd. were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(29-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 5. The result of the laser-welding is also shown in Table 5.

EXAMPLE 30

(30-a) Preparation of Laser-Transmissible-Absorptive Molded Workpieces 1 and 2

499.75 g of a polyphenylene sulfide resin of catalog No. FORTRON (the registered trademark) 0220A9 available from Polyplastics Co., Ltd. and 0.25 g of nigrosine of catalog No. NUBIAN (the registered trademark) BLACK PA9803 available from Orient Chemical Industries, Ltd. were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 1 mm were prepared.

(30-b) Manufacture of Laser-Welded Article

Then, the laser-transmissible-absorptive molded workpieces 1 and 2 were piled and put together as shown in FIG. 1. Using the diode laser machine having 10 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 5. The result of the laser-welding is also shown in Table 5.

COMPARATIVE EXAMPLE 9

(9-A) Preparation of Laser-Transmissible-Absorptive Molded Workpieces 499 g of a polyphenylene sulfide resin of catalog No. FORTRON (the registered trademark) 0220A9 available from Polyplastics Co., Ltd. and 1 g of nigrosine of catalog No. NUBIAN (the registered trademark) BLACK PA9803 available from Orient Chemical Industries, Ltd. were added in a tumbler made of stainless steel and were mixed with stirring for 1 hour. The obtained mixture was molded at 310° C. of temperature of a cylinder and 150° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 2 mm were prepared.

(9-B) Manufacture of Laser-Welded Article

Then, the laser-transmissible-absorptive molded workpieces 1 and 2 were piled and put together. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.0 mm/sec. of scanning speed for 20 mm. However, a laser-welded article was not obtained.

The absorbance and the absorption coefficient of the laser-transmissible-absorptive molded workpieces evaluated by following procedures are shown in Table 5. The result of the laser-welding is also shown in Table 5.

The laser-transmissible-absorptive molded workpieces were manufactured experimentally by using a polypropylene resin, and then the molded workpieces were piled as shown in FIG. 1 and they were welded by the laser. Examples of experimentally manufacturing the laser-welded articles to which the present invention was applied are shown in Examples 31 to 32.

EXAMPLE 31

(31-a) Preparation of Laser-Transmissible-Absorptive Molded Workpieces 1 and 2

499.95 g of a polypropylene resin of catalog No. NOVATEC (the registered trademark) MA04A available from Japan Polypropylene Corporation and 0.05 g of a naphthalocyanine of catalog No. YKR-5010 available from Yamamoto Chemicals, Inc., were added in a tumbler made of stainless steel and were mixed with stirring for 1 hour. The obtained mixture was molded at 200° C. of temperature of a cylinder and 40° C. of temperature of a metal mold with general procedures using an injection molding machine of catalog No. Si-50 that is available from Toyo Machinery & Metal Co., Ltd. Then, laser-transmissible-absorptive molded workpieces 1 and 2 having the length of 80 mm, the width of 50 mm and the thickness of 2 mm were prepared.

(31-b) Manufacture of Laser-Welded Article

Then, the laser-transmissible-absorptive molded workpieces 1 and 2 were piled and put together as shown in FIG. 1. Using the diode laser machine having 30 W of the output power that is available from Fine Device Co., Ltd., the scanning laser beam 4 of the wavelength of 940 nm was continuously irradiated from the upper side of the laser-transmissible-absorptive molded workpiece 1 towards the put portion under 1.5 mm/sec. of scanning speed for 20 mm. Then, a laser-welded article joined uniformly was obtained.

The absorbance and the absorption coefficient of the laser-transmissible-absorptive molded workpieces evaluated by following procedures are shown in Table 5. The result of the laser-welding is also shown in Table 5.

EXAMPLE 32

(32-a) Preparation of Laser-Transmissible-Absorptive Molded Workpieces 1 and 2

498.0 g of a polypropylene resin of catalog No. NOVATEC (the registered trademark) BC05B available from Japan Polypropylene procedures for physical evaluations.
(1) Calculation of Absorbance and Absorption Coefficient ($\epsilon_j$)

The absorption coefficient was calculated as follows. By using a spectrophotometer of catalog No. V-570 available from JASCO Corporation, the absorbance $a_1$ of the laser-transmissible-absorptive molded workpieces 1 and 2 under the wavelength of 940 nm was calculated by Lambert-Beer law which is represented by the following numerical expression (1)

$$\text{Absorbance } a = -\log T = -\log \{I_T/(I_0 - I_R)\} \quad (1)$$

[In the expression (1), $I_0$ is the incident light intensity, $I_T$ is the transmitted light intensity, $I_R$ is the reflected light intensity]. Furthermore, a calibration curve was prepared. The absorbance $a_i$ is represented by the following numerical expression (2).

$$\text{Absorbance } a_1 = \epsilon_1 C_1 L_1 \quad (2)$$

Therefore, the absorption coefficient $\epsilon_{j1}$ (1/cm) was calculated from the slope of the calibration curve. The absorbance and the absorption coefficient of the molded workpiece containing colorant other than nigrosine are calculated similarly. Also, the absorbance $a_2$ and the absorption coefficient $\epsilon_{j2}$ are calculated similarly.

(2) Tensile Strength Test

As regards the laser-welded articles obtained in Examples and Comparative Examples, the tensile strength test using a tensile strength tester of catalog No. AG-50kNE available from Shimazu Corporation was executed as follows in order to determine the tensile strength of the welding thereof. In accordance with Japanese Industrial Standard K 7113-1995, the tensile strength of the welding was measured by tensing the laser-welded article to both opposite dimensions of lengthwise, which pulls the welding position apart, under 10 mm/min. of tensile speed.

(3) Visual Observation of Appearance

The appearance of the welded portion of the laser-welded articles obtained in Examples and Comparative Examples was judged by the visual observation.

The results of the physical evaluations of the laser-welded articles of Examples and Comparative Examples are shown in Tables 1 to 5.

TABLE 1

| | | | Example | | | | | | |
|---|---|---|---|---|---|---|---|---|---|
| | | | 1 | 2 | 3 | 4 | 5 | 6 | 7 |
| Laser-transmissible-absorptive Molded workpiece 1 | Composition Rate (wt %) | Polyamide 66 | 99.98 | 99.96 | 99.9 | 99.99 | 99.78 | 99.98 | 99.99 |
| | | Nigrosine | 0.02 | 0.04 | 0.1 | 0.01 | 0.02 | 0.02 | 0.01 |
| | | Carbon Black | 0 | 0 | 0 | 0 | 0 | 0 | 0 |
| | | Black Colorant | 0 | 0 | 0 | 0 | 0.2 | 0 | 0 |
| | Property | Thickness (mm) | 1 | 0.5 | 0.25 | 1 | 1 | 1 | 3 |
| | | *$\epsilon_{j1}$ (×10³) | 5.7 | 5.7 | 5.7 | 5.7 | 5.7 | 5.7 | 5.7 |
| | | Absorbance $a_1$ | 0.19 | 0.13 | 0.16 | 0.09 | 0.19 | 0.19 | 0.27 |
| | | *Absorbance | 0.19 | 0.26 | 0.64 | 0.09 | 0.19 | 0.19 | 0.09 |
| Laser-transmissible-absorptive Molded workpiece 2 | Composition Rate (wt %) | Polyamide 66 | 99.98 | 99.96 | 99.9 | 99.99 | 99.96 | — | 99.99 |
| | | Nigrosine | 0.02 | 0.04 | 0.1 | 0.01 | 0.04 | — | 0.01 |
| | | Carbon Black | 0 | 0 | 0 | 0 | 0 | — | 0 |
| | Property | Thickness (mm) | 1 | 0.5 | 0.25 | 1 | 1 | — | 3 |
| | | *$\epsilon_{j2}$ (×10³) | 5.7 | 5.7 | 5.7 | 5.7 | 5.7 | — | 5.7 |
| | | Absorbance $a_2$ | 0.19 | 0.13 | 0.16 | 0.09 | 0.28 | — | 0.27 |
| | | *Absorbance | 0.19 | 0.26 | 0.64 | 0.09 | 0.28 | — | 0.09 |
| Laser Welding | | Scanning Speed (mm/sec) | 1 | 2.5 | 6.5 | 1 | 1 | 1 | 2.2 |
| | | Output Power of Laser (W) | 10 | 10 | 10 | 10 | 10 | 10 | 70 |
| | | Tensile Strength (N) | 608.3 | 304.1 | 253.4 | 350.3 | 608.3 | 602.0 | 793.6 |
| | | Appearance | *Ex | *Ex | *Ex | *Ex | *Ex | *Ex | *Ex |

*$\epsilon_{j1}$ ($\epsilon_{j2}$): Absorption Coefficident $\epsilon_{j1}$ ($\epsilon_{j2}$) (×10³)
*Absorbance: Absorbance converted into the absorbance of the molded workpiece with 1 mm thickness
*Ex: Excellent

TABLE 2

| | | | Example | | | | | | | Comp. Ex. | | |
|---|---|---|---|---|---|---|---|---|---|---|---|---|
| | | | 8 | 9 | 10 | 11 | 12 | 13 | 14 | 1 | 2 | 3 |
| Laser-transmissible-absorptive Molded Workpiece 1 | Composition Rate (wt %) | Polyamide 66 | 99.96 | 99.8 | 99.6 | 99.5 | 99.9 | 99.8 | 99.8 | 99 | 100 | 99.8 |
| | | Nigrosine | 0.04 | 0.2 | 0.4 | 0.5 | 0.1 | 0.2 | 0.2 | 1 | 0 | 0 |
| | | Carbon Black | 0 | 0 | 0 | 0 | 0 | 0 | 0 | 0 | 0 | 0.2 |
| | | Black Colorant | 0 | 0 | 0 | 0 | 0 | 0 | 0 | 0 | 0 | 0 |

TABLE 2-continued

|  |  |  | Example | | | | | | | Comp. Ex. | | |
|---|---|---|---|---|---|---|---|---|---|---|---|---|
|  |  |  | 8 | 9 | 10 | 11 | 12 | 13 | 14 | 1 | 2 | 3 |
|  | Property | Thickness (mm) | 1 | 1 | 1 | 1 | 1 | 1 | 1 | 1 | 1 | 1 |
|  |  | Absorption Coefficient *$\epsilon_{j1}$ (×10³) | 3.6 | 3.9 | 3.9 | 3.9 | 3.9 | 3.9 | 3.9 | 5.7 | — | 14.0 |
|  |  | Absorbance $a_1$ | 0.24 | 0.80 | 1.62 | 2.00 | 0.43 | 0.80 | 0.80 | 5.73 | 0.03 | 2.8 |
|  |  | *Absorbance | 0.24 | 0.80 | 1.62 | 2.00 | 0.43 | 0.80 | 0.80 | 5.73 | 0.03 | 2.8 |
| Laser-transmissible-absorptive Molded Workpiece 2 | Composition Rate (wt %) | Polyamide 66 | — | 99.8 | 99.6 | 99.5 | 99.9 | 99.7 | 99.9 | 99 | 100 | 99.8 |
|  |  | Nigrosine | — | 0.2 | 0.4 | 0.5 | 0.1 | 0.3 | 0.1 | 1 | 0 | 0 |
|  |  | Carbon Black | — | 0 | 0 | 0 | 0 | 0 | 0 | 0 | 0 | 0.2 |
|  | Property | Thickness (mm) | — | 1 | 1 | 1 | 2 | 1.5 | 1.5 | 1 | 1 | 0 |
|  |  | Absorption Coefficient *$\epsilon_{j2}$ (×10³) | — | 3.9 | 3.9 | 3.9 | 3.9 | 3.9 | 3.9 | 5.7 | — | 1 |
|  |  | Absorbance $a_2$ | — | 0.80 | 1.62 | 2.00 | 0.86 | 1.80 | 0.65 | 5.7 | 0.03 | 14.0 |
|  |  | *Absorbance | — | 0.80 | 1.62 | 2.00 | 0.43 | 1.20 | 0.43 | 5.73 | 0.03 | 2.8 |
| Laser Welding |  | Scanning Speed (mm/sec) | 1 | 1 | 1 | 1 | 2 | 2 | 1 | 1 | 1 | 1 |
|  |  | Output Power of Laser (W) | 10 | 10 | 10 | 10 | 10 | 10 | 10 | 10 | 10 | 10 |
|  |  | Tensile Strength (N) | 574.1 | 503.3 | 471.4 | 309.7 | 568.5 | 532.2 | 432.7 | *No | *No | *No |
|  |  | Appearance | *Ex | *Ex | *Ex | *Ex | *Ex | *Ex | *Ex | — | — | — |

*Absorbance: Absorbance converted into the absorbance of the molded workpiece with 1 mm thickness
*No: Not Welding
*Ex: Excellent

TABLE 3

|  |  |  | Example | | | | Comp. Ex. | |
|---|---|---|---|---|---|---|---|---|
|  |  |  | 15 | 16 | 17 | 18 | 4 | 5 |
| Laser-transmissible-absorptive Molded Workpiece 1 | Composition Rate (wt %) | Polyamide 6 | 99.98 | 99.998 | 99.995 | 99.995 | 100 | 99.8 |
|  |  | Nigrosine | 0 | 0.002 | 0.005 | 0.005 | 0 | 0 |
|  |  | Naphthalocyanine | 0.02 | 0 | 0 | 0 | 0 | 0 |
|  |  | Carbon Black | 0 | 0 | 0 | 0 | 0 | 0.2 |
|  |  | Black Colorant | 0 | 0 | 0 | 0 | 0 | 0 |
|  | Property | Thickness (mm) | 1 | 2 | 2 | 2 | 1 | 1 |
|  |  | Absorption Coefficient *$\epsilon_{j1}$ (×10³) | 5.3 | 4.2 | 4.2 | 4.2 | — | 11.0 |
|  |  | Absorbance $a_1$ | 0.11 | 0.22 | 0.24 | 0.24 | 0.03 | 2.2 |
|  |  | *Absorbance | 0.11 | 0.11 | 0.12 | 0.12 | 0.03 | 2.2 |
| Laser-transmissible-absorptive Molded Workpiece 2 | Composition Rate (wt %) | Polyamide 6 | 99.98 | 99.998 | 99.995 | 99.99 | 100 | 99.8 |
|  |  | Nigrosine | 0 | 0.002 | 0.005 | 0.01 | 0 | 0 |
|  |  | Naphthalocyanine | 0.02 | 0 | 0 | 0 | 0 | 0 |
|  |  | Carbon Black | 0 | 0 | 0 | 0 | 0 | 0.2 |
|  | Property | Thickness (mm) | 1 | 2 | 2 | 3 | 1 | 1 |
|  |  | Absorption Coefficient *$\epsilon_{j2}$ (×10³) | 5.3 | 4.2 | 4.2 | 4.2 | — | 11.0 |
|  |  | Absorbance $a_2$ | 0.11 | 0.22 | 0.24 | 0.75 | 0.03 | 2.2 |
|  |  | *Absorbance | 0.11 | 0.11 | 0.12 | 0.25 | 0.03 | 2.2 |
| Laser Welding |  | Scanning Speed (mm/sec) | 1 | 0.5 | 0.6 | 0.9 | 1 | 1 |
|  |  | Output Power of Laser (W) | 10 | 30 | 30 | 50 | 30 | 30 |
|  |  | Tensile Strength (N) | 330.3 | 473 | 548.6 | 854.2 | *No | *No |
|  |  | Appearance | *Ex | *Ex | *Ex | *Ex | — | — |

*Absorbance: Absorbance converted into the absorbance of the molded workpiece with 1 mm thickness
*No: Not Welding
*Ex: Excellent

TABLE 4

| | | | Example | | | | | | Comp. Ex | |
|---|---|---|---|---|---|---|---|---|---|---|
| | | | 19 | 20 | 21 | 22 | 23 | 24 | 6 | 7 |
| Laser-transmissible-absorptive Molded Workpiece 1 | Composition Rate (wt %) | Polycarbonate | 99.5 | 99.7 | 99.8 | 99.95 | 99.6 | 99.6 | 100 | 99.93 |
| | | Nigrosine | 0.5 | 0.3 | 0.2 | 0.05 | 0.2 | 0.2 | 0 | 0 |
| | | Naphthalo-cyanine | 0 | 0 | 0 | 0 | 0 | 0 | 0 | 0 |
| | | Carbon Black | 0 | 0 | 0 | 0 | 0 | 0 | 0 | 0.07 |
| | | Black Colorant | 0 | 0 | 0 | 0 | 0.2 | 0.2 | 0 | 0 |
| | Property | Thickness (mm) | 1 | 1 | 1 | 1 | 1 | 1 | 1 | 1 |
| | | Absorption Coefficient *$\epsilon_{j1}$ (×10$^3$) | 3.3 | 3.3 | 3.3 | 3.3 | 3.3 | 3.3 | — | 29 |
| | | Absorbance $a_1$ | 1.69 | 1.02 | 0.67 | 0.2 | 0.69 | 0.69 | 0 | 2.07 |
| | | *Absorbance | 1.69 | 1.02 | 0.67 | 0.2 | 0.69 | 0.69 | — | 2.07 |
| Laser-transmissible-absorptive Molded Workpiece 2 | Composition Rate (wt %) | Polycarbonate | 99.5 | 99.7 | 99.8 | 99.95 | 99.6 | 99.75 | 100 | 99.93 |
| | | Nigrosine | 0.5 | 0.3 | 0.2 | 0.05 | 0.2 | 0.25 | 0 | 0 |
| | | Naphthalo-cyanine | 0 | 0 | 0 | 0 | 0 | 0 | 0 | 0 |
| | | Carbon Black | 0 | 0 | 0 | 0 | 0 | 0 | 0 | 0.07 |
| | | Black Colorant | 0 | 0 | 0 | 0 | 0.2 | 0 | 0 | 0 |
| | Property | Thickness (mm) | 1 | 1 | 1 | 1 | 1 | 2 | 1 | 1 |
| | | Absorption Coefficient *$\epsilon_{j2}$ (×10$^3$) | 3.3 | 3.3 | 3.3 | 3.3 | 3.3 | 3.3 | 0 | 29 |
| | | Absorbance $a_2$ | 1.69 | 1.02 | 0.67 | 0.2 | 0.69 | 1.70 | 0 | 2.07 |
| | | *Absorbance | 1.69 | 1.02 | 0.67 | 0.2 | 0.69 | 0.85 | — | 2.07 |
| Laser Welding | | Scanning Speed (mm/sec) | 1 | 1 | 1 | 1 | 1 | 1 | 1 | 1 |
| | | Output Power of Laser (W) | 10 | 10 | 10 | 10 | 10 | 10 | 10 | 10 |
| | | Tensile Strength (N) | 442.2 | 585.4 | 578.2 | 509.3 | 583.8 | 598.5 | *No | *No |
| | | Appearance | *Ex | *Ex | *Ex | *Ex | *Ex | *Ex | — | — |

*Absorbance: Absorbance converted into the absorbance of the molded workpiece with 1 mm thickness
*No: Not Welding
*Ex: Excellent

TABLE 5

| | | | Example | | | *C.E. | Example | | | *C.E. | Example | |
|---|---|---|---|---|---|---|---|---|---|---|---|---|
| | | | 25 | 26 | 27 | 8 | 28 | 29 | 30 | 9 | 31 | 32 |
| Laser-transmissible-absorptive Molded Workpiece 1 | Composition Rate (wt %) | Polybutylene Telephthalate | 99.998 | 99.9 | 99.99 | 99.8 | 0 | 0 | 0 | 0 | 0 | 0 |
| | | Polyphenylene Sulfide | 0 | 0 | 0 | 0 | 99.998 | 99.9 | 99.95 | 99.8 | 0 | 0 |
| | | Polypropylene | 0 | 0 | 0 | 0 | 0 | 0 | 0 | 0 | 99.99 | 99.6 |
| | | Nigrosine | 0.002 | 0.1 | 0.01 | 0.2 | 0.002 | 0.1 | 0.05 | 0.2 | 0 | 0.4 |
| | | Naphthalo-cyanine | 0 | 0 | 0 | 0 | 0 | 0 | 0 | 0 | 0.01 | 0 |
| | Property | Thickness (mm) | 1 | 1 | 1 | 1 | 1 | 1 | 1 | 1 | 2 | 1 |
| | | Absorption Coefficient *$\epsilon_{j1}$ (×10$^3$) | 10.3 | 11.5 | 11.5 | 11.5 | 9.7 | 10.8 | 10.8 | 11.5 | 2.2 | 1.5 |
| | | Absorbance $a_1$ | 0.15 | 1.67 | 0.47 | 2.50 | 0.2 | 1.72 | 1.19 | 2.33 | 0.18 | 0.72 |
| | | *Absorbance | 0.15 | 1.67 | 0.47 | 2.50 | 0.2 | 1.72 | 1.19 | 2.33 | 0.09 | 0.72 |
| Laser-transmissible-absorptive Molded Workpiece 2 | Composition Rate (wt %) | Polybutylene Telephthalate | 99.998 | 99.9 | 99.99 | 99.8 | 0 | 0 | 0 | 0 | 0 | 0 |
| | | Polyphenylene Sulfide | 0 | 0 | 0 | 0 | 99.998 | 99.9 | 99.95 | 99.8 | 0 | 0 |
| | | Polypropylene | 0 | 0 | 0 | 0 | 0 | 0 | 0 | 0 | 99.99 | 99.6 |
| | | Nigrosine | 0.002 | 0.1 | 0.01 | 0.2 | 0.002 | 0.1 | 0.05 | 0.2 | 0 | 0.4 |
| | | Naphthalo-cyanine | 0 | 0 | 0 | 0 | 0 | 0 | 0 | 0 | 0.01 | 0 |
| | Property | Thickness (mm) | 1 | 1 | 1 | 1 | 1 | 1 | 1 | 1 | 2 | 1 |

TABLE 5-continued

|  |  | Example | | | *C.E. | Example | | | *C.E. | Example | |
| --- | --- | --- | --- | --- | --- | --- | --- | --- | --- | --- | --- |
|  |  | 25 | 26 | 27 | 8 | 28 | 29 | 30 | 9 | 31 | 32 |
|  | Absorption Coefficient *$\epsilon_{f2}$ (×10³) | 10.3 | 11.5 | 11.5 | 11.5 | 9.7 | 10.8 | 10.8 | 11.5 | 2.2 | 1.5 |
|  | Absorbance $a_2$ | 0.15 | 1.67 | 0.47 | 2.50 | 0.2 | 1.72 | 1.19 | 2.33 | 0.18 | 0.72 |
|  | *Absorbance | 0.15 | 1.67 | 0.47 | 2.50 | 0.2 | 1.72 | 1.19 | 2.33 | 0.09 | 0.72 |
| Laser Welding | Scanning Speed (mm/sec) | 0.6 | 2 | 1 | 0.6 | 0.3 | 1 | 1 | 1 | 1.5 | 2 |
|  | Output Power of Laser (W) | 30 | 10 | 10 | 30 | 30 | 10 | 10 | 30 | 30 | 10 |
|  | Tensile Strength (N) | 437.0 | 334.0 | 102.0 | *No | 557.8 | 471.0 | 517.0 | *No | 478.8 | 278.0 |
|  | Appearance | *Ex | *Ex | *Ex | — | *Ex | *Ex | *Ex | — | *Ex | *Ex |

*C.E.: Comparative Example
*Absorbance: Absorbance converted into the absorbance of the molded workpiece with 1 mm thickness
*No: Not Welding
*Ex: Excellent As it is evident with Table 1 to Table 5, the laser-welded articles of the present invention consist of the laser-transmissible-absorptive molded workpieces that are firmly welded respectively. The laser-welded articles have the excellent tensile strength and the excellent appearance at the portion of the laser-welding.

The laser-welded article of the present invention is used for automotive parts such as an instrument panel for automotive interior and a resonator (a silencer) in engine room; medical apparatus such as a medical tubing used for an instillation of infusion; food pouch such as a spout pouch used for sealing fluid diet and beverage composition; a label used for a bottle made of plastics; home electric appliances such as housing, for example.

What is claimed is:

1. A laser-welded article comprising:
an integral construction of a single laser-transmissible-absorptive molded workpiece where at least a part of a bent workpiece is overlapped, or a plurality of laser-transmissible-absorptive molded workpieces where at least a part of each workpiece is piled,
the integral construction being welded by heat generated from irradiation with a laser through laser welding by melting overlapped portions of the single laser-transmissible-absorptive molded workpiece, or laser welding by melting piled portions of the plurality of laser-transmissible-absorptive molded workpieces, the laser generating rays having a wavelength ranging from 800 nm to 1600 nm,
wherein the single laser-transmissible-absorptive molded workpiece or the plurality of laser-transmissible-absorptive molded workpieces have an absorbance "a" throughout the workpiece or the workpieces ranging from 0.07 to 0.8 converted into an absorbance of the molded workpiece with 1 mm thickness, and have an ability of absorbing at least a partial beam of the laser and transmitting another partial beam of the laser, the single laser-transmissible-absorptive molded workpiece or the plurality of laser-transmissible-absorptive molded workpieces including:
a thermoplastic resin selected from the group consisting of polyamide resin, polycarbonate resin, polyphenylene sulfide resin, polybutylene terephthalate resin, and polypropylene resin, and
a laser-transmissible absorbent of nigrosine dye, where the content of laser-transmissible absorbent ranges from 0.001 to 0.5 weight % against the thermoplastic resin.

2. The laser-welded article according to claim 1, wherein the integral construction of the single laser-transmissible-absorptive molded workpiece is welded where edge portions of the single laser-transmissible-absorptive molded workpiece overlap.

3. The laser-welded article according to claim 1, wherein the integral construction of the plurality of laser-transmissible-absorptive molded workpieces is welded where edge portions of the piled portions of the plurality of laser-transmissible-absorptive molded workpieces overlap.

4. The laser-welded article according to claim 1, wherein the thermoplastic resin is polyamide resin and an absorbance "a" of the laser-transmissible-absorptive molded workpiece ranges from 0.1 to 0.8.

5. The laser-welded article according to claim 1, wherein the thermoplastic resin is polycarbonate resin and an absorbance "a" of the laser-transmissible-absorptive molded workpiece ranges from 0.1 to 0.8.

6. The laser-welded article according to claim 1, wherein the thermoplastic resin is polypropylene resin and an absorbance "a" of the laser-transmissible-absorptive molded workpiece ranges from 0.1 to 0.8.

7. The laser-welded article according to claim 1, wherein the plurality of laser-transmissible-absorptive molded workpieces are used, and a ratio $a_1/a_2$ defined by an absorbance "$a_1$" of a first workpiece that the laser irradiates and an absorbance "$a_2$" of a second workpiece that is piled to the first workpiece ranges from 0.8 to 1.3.

8. The laser-welded article according to claim 7, wherein the ratio $a_1/a_2$ is 1.

9. The laser-welded article according to claim 1, wherein at least one of $C_1L_1$ and $C_2L_2$ ranges from $0.01 \times 10^{-3}$ to $4.0 \times 10^{-3}$, wherein
$C_1L_1$ is a product of a concentration $C_1$ (weight %) of the laser-transmissible absorbent of a first workpiece of the integral construction of the plurality of laser-transmissible-absorptive molded workpieces, and $L_1$ (cm) is a thickness of the first workpiece of the integral construction of the plurality of laser-transmissible-absorptive molded workpieces, and $C_2L_2$ is a product of a concentration $C_2$ (weight %) of the laser-transmissible absorbent of a second workpiece of the integral construction of the plurality of laser-transmissible-absorptive molded workpieces, and $L_2$ (cm) is a thickness of the second workpiece of the integral construction of the plurality of laser-transmissible-absorptive molded workpieces.

10. The laser-welded article according to claim 1, wherein the single laser-transmissible-absorptive molded workpiece or the plurality of laser-transmissible-absorptive molded workpieces have a thickness ranging from 200 to 5000 microns.

11. The laser-welded article according to claim 1, wherein the thermoplastic resin is at least one resin selected from the group consisting of polyamide resin, polycarbonate resin and polypropylene resin, and the content of the laser-transmissible absorbent ranges from 0.002 to 0.2 weight % against the thermoplastic resin.

12. The laser-welded article according to claim 1, wherein the thermoplastic resin is at least one resin selected from the group consisting of polybutylene terephthalate resin or polyphenylene sulfide resin, and the content of the laser-transmissible absorbent ranges from 0.001 to 0.2 weight % against the thermoplastic resin.

13. The laser-welded article according to claim 1, wherein the laser-transmissible-absorbent has an absorption coefficient $E_d$ ranging from 1000 to 8000(ml/g·cm).

* * * * *